United States Patent
Bosshart

(10) Patent No.: US 12,445,542 B2
(45) Date of Patent: Oct. 14, 2025

(54) CONFIGURING A SWITCH FOR EXTRACTING PACKET HEADER FIELDS

(71) Applicant: Barefoot Networks, Inc., Santa Clara, CA (US)

(72) Inventor: Patrick Bosshart, Plano, TX (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 18/212,546

(22) Filed: Jun. 21, 2023

(65) Prior Publication Data

US 2023/0344922 A1 Oct. 26, 2023

Related U.S. Application Data

(63) Continuation of application No. 17/570,994, filed on Jan. 7, 2022, now abandoned, which is a continuation of application No. 16/288,074, filed on Feb. 27, 2019, now Pat. No. 11,245,778, which is a continuation of application No. 15/729,593, filed on Oct. 10, 2017, (Continued)

(51) Int. Cl.
*H04L 45/745* (2022.01)
*H04L 49/00* (2022.01)
*H04L 69/22* (2022.01)

(52) U.S. Cl.
CPC .......... *H04L 69/22* (2013.01); *H04L 49/3009* (2013.01)

(58) Field of Classification Search
None
See application file for complete search history.

(56) References Cited

U.S. PATENT DOCUMENTS 1,522,006 A 1/1925 Fletcher
5,243,596 A 9/1993 Port et al.
(Continued)

FOREIGN PATENT DOCUMENTS

CN 1589551 3/2005
CN 101352012 1/2009
(Continued)

OTHER PUBLICATIONS

Advisory Action for U.S. Appl. No. 15/835,238, dated Nov. 22, 2019, 3 pages.
(Continued)

*Primary Examiner* — Kodzovi Acolatse
(74) *Attorney, Agent, or Firm* — Essential Patents Group, LLP; Christopher K. Gagne

(57) ABSTRACT

A method for generating configuration data for configuring a hardware switch is described. The method receives a description of functionality for the hardware switch. Based on the description, the method generates sets of match and action entries to configure the hardware switch to process packets. The method then determines, for each packet header field in a parse graph that specifies instructions for a parser of the switch to extract packet header fields from packets, whether the packet header field is used or modified by at least one match or action entry. The method generates for the parser of the hardware switch configuration data that instructs the parser to extract (i) packet header fields used or modified by at least one match or action entry to a first set of registers and (ii) packet header fields not used by any match or action entries to a second set of registers.

20 Claims, 9 Drawing Sheets

Related U.S. Application Data now Pat. No. 10,225,381, which is a continuation of application No. 14/836,855, filed on Aug. 26, 2015, now Pat. No. 9,826,071.

(56) References Cited

U.S. PATENT DOCUMENTS

| | | |
|---|---|---|
| 5,642,483 A | 6/1997 | Topper |
| 5,784,003 A | 7/1998 | Dahlgren |
| 6,157,955 A | 12/2000 | Narad et al. |
| 6,442,172 B1 | 8/2002 | Wallner et al. |
| 6,453,360 B1 | 9/2002 | Muller et al. |
| 6,735,679 B1 | 5/2004 | Herbst et al. |
| 6,836,483 B1 | 12/2004 | Lee |
| 6,948,099 B1 | 9/2005 | Tallam |
| 6,976,149 B1 | 12/2005 | Brandt et al. |
| 6,980,552 B1 | 12/2005 | Belz et al. |
| 7,042,888 B2 | 5/2006 | Berggreen |
| 7,046,685 B1 | 5/2006 | Matsuoka et al. |
| 7,062,571 B1 | 6/2006 | Dale et al. |
| 7,177,276 B1 | 2/2007 | Epps et al. |
| 7,203,740 B1 | 4/2007 | Putzolu et al. |
| 7,389,462 B1 | 6/2008 | Wang et al. |
| 7,492,714 B1 | 2/2009 | Liao et al. |
| 7,499,941 B2 | 3/2009 | Michaeli et al. |
| 7,539,777 B1 | 5/2009 | Aitken |
| 7,633,880 B2 | 12/2009 | Bang et al. |
| 7,643,486 B2 | 1/2010 | Belz et al. |
| 7,826,470 B1 | 11/2010 | Aloni et al. |
| 7,872,774 B2 | 1/2011 | Okamoto |
| 7,873,959 B2 | 1/2011 | Zhu et al. |
| 7,889,750 B1 | 2/2011 | Parker |
| 7,904,642 B1 | 3/2011 | Gupta et al. |
| 7,961,734 B2 | 6/2011 | Panwar et al. |
| 8,077,611 B2 | 12/2011 | Bettink et al. |
| 8,094,659 B1 | 1/2012 | Arad |
| 8,155,135 B2 | 4/2012 | Aloni et al. |
| 8,514,855 B1 | 8/2013 | Robertson et al. |
| 8,527,613 B2 | 9/2013 | Malone et al. |
| 8,593,955 B2 | 11/2013 | Yano et al. |
| 8,638,793 B1 | 1/2014 | Ben-Mayor et al. |
| 8,693,374 B1 | 4/2014 | Murphy et al. |
| 8,738,860 B1 | 5/2014 | Griffin et al. |
| 8,788,512 B2 | 7/2014 | Asaad et al. |
| 8,798,047 B1 | 8/2014 | Wadekar et al. |
| 8,971,338 B2 | 3/2015 | Mishra et al. |
| 9,049,153 B2 | 6/2015 | Casado et al. |
| 9,049,271 B1 | 6/2015 | Hobbs et al. |
| 9,055,004 B2 | 6/2015 | Edsall et al. |
| 9,055,114 B1 | 6/2015 | Talaski et al. |
| 9,112,818 B1 | 8/2015 | Arad et al. |
| 9,124,644 B2 | 9/2015 | Patel et al. |
| 9,213,537 B2 | 12/2015 | Bandakka et al. |
| 9,258,224 B2 | 2/2016 | Bosshart et al. |
| 9,276,846 B2 | 3/2016 | Goyal et al. |
| 9,276,851 B1 | 3/2016 | Dror et al. |
| 9,294,386 B2 | 3/2016 | Narad |
| 9,298,446 B2 | 3/2016 | Chang et al. |
| 9,438,505 B1 | 9/2016 | Zhou et al. |
| 9,450,817 B1 | 9/2016 | Bahadur et al. |
| 9,467,363 B2 | 10/2016 | Gao |
| 9,544,231 B2 | 1/2017 | Bosshart et al. |
| 9,590,925 B2 | 3/2017 | Yamashita |
| 9,686,209 B1 | 6/2017 | Arad et al. |
| 9,692,690 B2 | 6/2017 | Joshi et al. |
| 9,712,439 B2 | 7/2017 | Bosshart et al. |
| 9,755,932 B1 | 9/2017 | Godbole et al. |
| 9,825,862 B2 | 11/2017 | Bosshart |
| 9,826,071 B2 | 11/2017 | Bosshart |
| 9,838,268 B1 | 12/2017 | Mattson |
| 9,888,033 B1 | 2/2018 | Li et al. |
| 9,891,898 B1 | 2/2018 | Tonsing |
| 9,912,610 B2 | 3/2018 | Bosshart et al. |
| 9,912,774 B2 | 3/2018 | Daly et al. |
| 9,923,816 B2 | 3/2018 | Kim et al. |
| 9,960,956 B1 | 5/2018 | Johnson et al. |
| 10,009,276 B2 | 6/2018 | Bosshart et al. |
| 10,015,048 B2 | 7/2018 | Gasparakis et al. |
| 10,044,646 B1 | 8/2018 | Detwiler |
| 10,091,137 B2 | 10/2018 | Tran et al. |
| 10,135,734 B1 | 11/2018 | Singh et al. |
| 10,225,381 B1 | 3/2019 | Bosshart |
| 10,291,555 B2 | 5/2019 | K et al. |
| 10,341,242 B2 | 7/2019 | Srinivasan et al. |
| 10,361,914 B2 | 7/2019 | Gasparakis et al. |
| 10,412,018 B1 | 9/2019 | Feng et al. |
| 10,419,242 B1 | 9/2019 | Tonsing et al. |
| 10,419,366 B1 | 9/2019 | Kim et al. |
| 10,432,527 B1 | 10/2019 | Bosshart |
| 10,686,735 B1 | 6/2020 | Watson |
| 10,694,006 B1 | 6/2020 | Watson et al. |
| 10,757,028 B1 | 8/2020 | Watson et al. |
| 10,892,939 B2 | 1/2021 | Castaldelli et al. |
| 11,863,467 B2 | 1/2024 | Galles et al. |
| 2001/0043611 A1 | 11/2001 | Kadambi et al. |
| 2002/0001356 A1 | 1/2002 | Shenoi |
| 2002/0136163 A1 | 9/2002 | Kawakami et al. |
| 2002/0172210 A1 | 11/2002 | Wolrich et al. |
| 2003/0009466 A1 | 1/2003 | Ta et al. |
| 2003/0043825 A1 | 3/2003 | Magnussen et al. |
| 2003/0046414 A1 | 3/2003 | Pettyjohn et al. |
| 2003/0046429 A1 | 3/2003 | Sonksen |
| 2003/0063345 A1 | 4/2003 | Fossum et al. |
| 2003/0107996 A1 | 6/2003 | Black et al. |
| 2003/0118022 A1 | 6/2003 | Kulkarni et al. |
| 2003/0147401 A1 | 8/2003 | Kyronaho et al. |
| 2003/0154358 A1 | 8/2003 | Seong et al. |
| 2003/0167373 A1 | 9/2003 | Winters et al. |
| 2003/0219026 A1 | 11/2003 | Sun et al. |
| 2004/0024894 A1 | 2/2004 | Osman et al. |
| 2004/0031029 A1 | 2/2004 | Lee et al. |
| 2004/0042477 A1 | 3/2004 | Bitar et al. |
| 2004/0105384 A1 | 6/2004 | Gallezot et al. |
| 2004/0123220 A1 | 6/2004 | Johnson et al. |
| 2004/0165588 A1 | 8/2004 | Pandya |
| 2004/0213156 A1 | 10/2004 | Smallwood et al. |
| 2005/0013251 A1 | 1/2005 | Wang et al. |
| 2005/0041590 A1 | 2/2005 | Olakangil et al. |
| 2005/0060428 A1 | 3/2005 | Corl et al. |
| 2005/0078651 A1 | 4/2005 | Lee et al. |
| 2005/0086353 A1 | 4/2005 | Shirakawa et al. |
| 2005/0108518 A1 | 5/2005 | Pandya |
| 2005/0120173 A1 | 6/2005 | Minowa |
| 2005/0129059 A1 | 6/2005 | Jiang et al. |
| 2005/0135399 A1 | 6/2005 | Baden et al. |
| 2005/0149823 A1 | 7/2005 | Lee |
| 2005/0198531 A1 | 9/2005 | Kaniz et al. |
| 2005/0243852 A1 | 11/2005 | Bitar et al. |
| 2006/0002386 A1 | 1/2006 | Yik et al. |
| 2006/0039372 A1 | 2/2006 | Sarkinen et al. |
| 2006/0039374 A1 | 2/2006 | Belz et al. |
| 2006/0050690 A1 | 3/2006 | Epps et al. |
| 2006/0072480 A1 | 4/2006 | Deval et al. |
| 2006/0092857 A1 | 5/2006 | Ansari et al. |
| 2006/0114895 A1 | 6/2006 | Anand et al. |
| 2006/0114914 A1 | 6/2006 | Anand et al. |
| 2006/0117126 A1 | 6/2006 | Leung et al. |
| 2006/0174242 A1 | 8/2006 | Zhu et al. |
| 2006/0277346 A1 | 12/2006 | Doak et al. |
| 2007/0008985 A1 | 1/2007 | Lakshmanamurthy et al. |
| 2007/0050426 A1 | 3/2007 | Dubal et al. |
| 2007/0055664 A1 | 3/2007 | Michaeli et al. |
| 2007/0104102 A1 | 5/2007 | Opsasnick |
| 2007/0104211 A1 | 5/2007 | Opsasnick |
| 2007/0153796 A1 | 7/2007 | Kesavan et al. |
| 2007/0195761 A1 | 8/2007 | Tatar et al. |
| 2007/0195773 A1 | 8/2007 | Tatar et al. |
| 2007/0208876 A1 | 9/2007 | Davis |
| 2007/0223388 A1 | 9/2007 | Arad et al. |
| 2007/0230493 A1 | 10/2007 | Dravida et al. |
| 2007/0236734 A1 | 10/2007 | Okamoto |
| 2007/0280277 A1 | 12/2007 | Lund et al. |
| 2008/0082792 A1 | 4/2008 | Vincent et al. |
| 2008/0130670 A1 | 6/2008 | Kim et al. |
| 2008/0144662 A1 | 6/2008 | Marcondes et al. |

(56) References Cited

U.S. PATENT DOCUMENTS

| | | |
|---|---|---|
| 2008/0175449 A1 | 7/2008 | Fang et al. |
| 2008/0285571 A1 | 11/2008 | Arulambalam et al. |
| 2009/0006605 A1 | 1/2009 | Chen et al. |
| 2009/0096797 A1 | 4/2009 | Du et al. |
| 2009/0106523 A1 | 4/2009 | Steiss |
| 2009/0147787 A1 | 6/2009 | Arulambalam et al. |
| 2009/0180475 A1 | 7/2009 | Hashimoto |
| 2010/0085891 A1 | 4/2010 | Kind et al. |
| 2010/0128735 A1 | 5/2010 | Lipschutz |
| 2010/0135158 A1 | 6/2010 | Adams |
| 2010/0140364 A1 | 6/2010 | Nordberg et al. |
| 2010/0145475 A1 | 6/2010 | Bartels et al. |
| 2010/0150164 A1 | 6/2010 | Ma |
| 2010/0182920 A1 | 7/2010 | Matsuoka |
| 2010/0191951 A1 | 7/2010 | Malone et al. |
| 2010/0228733 A1 | 9/2010 | Harrison et al. |
| 2010/0238812 A1 | 9/2010 | Boutros et al. |
| 2010/0312941 A1 | 12/2010 | Aloni et al. |
| 2011/0080916 A1 | 4/2011 | Davies et al. |
| 2011/0149776 A1 | 6/2011 | Park et al. |
| 2011/0149960 A1 | 6/2011 | Gutierrez |
| 2012/0033550 A1 | 2/2012 | Yano et al. |
| 2012/0155395 A1 | 6/2012 | Yadav et al. |
| 2012/0159235 A1 | 6/2012 | Suganthi et al. |
| 2012/0170585 A1 | 7/2012 | Mehra et al. |
| 2012/0173661 A1 | 7/2012 | Mahaffey et al. |
| 2012/0177047 A1 | 7/2012 | Roitshtein |
| 2012/0284438 A1 | 11/2012 | Zievers |
| 2013/0003556 A1 | 1/2013 | Boden et al. |
| 2013/0028265 A1 | 1/2013 | Ronchetti et al. |
| 2013/0100951 A1 | 4/2013 | Ishizuka |
| 2013/0108264 A1 | 5/2013 | Deruijter et al. |
| 2013/0124491 A1 | 5/2013 | Pepper et al. |
| 2013/0163426 A1 | 6/2013 | Beliveau et al. |
| 2013/0163427 A1 | 6/2013 | Beliveau et al. |
| 2013/0163475 A1 | 6/2013 | Beliveau et al. |
| 2013/0166703 A1 | 6/2013 | Hammer et al. |
| 2013/0227051 A1 | 8/2013 | Khakpour et al. |
| 2013/0227519 A1 | 8/2013 | Maleport |
| 2013/0290622 A1 | 10/2013 | Dey et al. |
| 2013/0315054 A1 | 11/2013 | Shamis et al. |
| 2013/0318107 A1 | 11/2013 | Asaad et al. |
| 2013/0346814 A1 | 12/2013 | Zadigian et al. |
| 2014/0033489 A1 | 2/2014 | Kawashima |
| 2014/0040527 A1 | 2/2014 | Kanigicheria et al. |
| 2014/0043974 A1 | 2/2014 | Kwan et al. |
| 2014/0050002 A1 | 2/2014 | Sun |
| 2014/0082302 A1 | 3/2014 | Rommelmann et al. |
| 2014/0115571 A1 | 4/2014 | Wang et al. |
| 2014/0115666 A1 | 4/2014 | Garcia Morchon et al. |
| 2014/0140342 A1 | 5/2014 | Narad |
| 2014/0181232 A1 | 6/2014 | Manula et al. |
| 2014/0181818 A1 | 6/2014 | Vincent et al. |
| 2014/0204943 A1 | 7/2014 | Palmer |
| 2014/0233568 A1 | 8/2014 | Dong |
| 2014/0241358 A1 | 8/2014 | Bosshart et al. |
| 2014/0241359 A1 | 8/2014 | Bosshart et al. |
| 2014/0241361 A1 | 8/2014 | Bosshart et al. |
| 2014/0241362 A1 | 8/2014 | Bosshart et al. |
| 2014/0244966 A1 | 8/2014 | Bosshart et al. |
| 2014/0269432 A1 | 9/2014 | Goyal et al. |
| 2014/0301192 A1 | 10/2014 | Lee et al. |
| 2014/0321473 A1 | 10/2014 | Chen et al. |
| 2014/0321476 A1 | 10/2014 | Yu et al. |
| 2014/0328180 A1 | 11/2014 | Kim et al. |
| 2014/0328344 A1 | 11/2014 | Bosshart |
| 2014/0334489 A1 | 11/2014 | Bosshart et al. |
| 2015/0003259 A1 | 1/2015 | Gao |
| 2015/0009796 A1 | 1/2015 | Koponen et al. |
| 2015/0010000 A1 | 1/2015 | Zhang et al. |
| 2015/0020060 A1 | 1/2015 | Bandakka et al. |
| 2015/0023147 A1 | 1/2015 | Lee et al. |
| 2015/0043589 A1 | 2/2015 | Han et al. |
| 2015/0081833 A1 | 3/2015 | Pettit et al. |
| 2015/0092539 A1 | 4/2015 | Sivabalan et al. |
| 2015/0109913 A1 | 4/2015 | Yamashita |
| 2015/0110114 A1 | 4/2015 | Wohlgemuth et al. |
| 2015/0121355 A1 | 4/2015 | Chang et al. |
| 2015/0131666 A1 | 5/2015 | Kang et al. |
| 2015/0131667 A1 | 5/2015 | Ko et al. |
| 2015/0142932 A1 | 5/2015 | Hallivuori et al. |
| 2015/0142991 A1 | 5/2015 | Zaloom |
| 2015/0146527 A1 | 5/2015 | Kishore et al. |
| 2015/0156288 A1 | 6/2015 | Lu et al. |
| 2015/0172198 A1 | 6/2015 | Levy et al. |
| 2015/0178395 A1 | 6/2015 | Tiwari et al. |
| 2015/0180769 A1 | 6/2015 | Wang et al. |
| 2015/0194215 A1 | 7/2015 | Douglas et al. |
| 2015/0195206 A1 | 7/2015 | Memon et al. |
| 2015/0222560 A1 | 8/2015 | Kakadia et al. |
| 2015/0249572 A1 | 9/2015 | Mack-Crane et al. |
| 2015/0256465 A1 | 9/2015 | Mack-Crane et al. |
| 2015/0271011 A1 | 9/2015 | Neginhal et al. |
| 2015/0281125 A1 | 10/2015 | Koponen et al. |
| 2015/0295862 A1* | 10/2015 | Banerjee ............ H04L 49/3009 370/392 |
| 2015/0319086 A1 | 11/2015 | Tripathi et al. |
| 2015/0363522 A1 | 12/2015 | Maurya |
| 2015/0381418 A1 | 12/2015 | Fausak et al. |
| 2015/0381495 A1 | 12/2015 | Cherian et al. |
| 2016/0006654 A1 | 1/2016 | Fernando et al. |
| 2016/0014028 A1* | 1/2016 | He ................... H04L 45/74591 370/392 |
| 2016/0014073 A1 | 1/2016 | Reddy et al. |
| 2016/0019161 A1 | 1/2016 | Patel et al. |
| 2016/0063189 A1 | 3/2016 | Soon-Shiong et al. |
| 2016/0094460 A1 | 3/2016 | Shelar et al. |
| 2016/0105471 A1 | 4/2016 | Nunes et al. |
| 2016/0139892 A1 | 5/2016 | Atreya et al. |
| 2016/0149784 A1 | 5/2016 | Zhang et al. |
| 2016/0156557 A1 | 6/2016 | Bosshart et al. |
| 2016/0173371 A1 | 6/2016 | Bays |
| 2016/0173383 A1 | 6/2016 | Liu et al. |
| 2016/0188313 A1 | 6/2016 | Dubal et al. |
| 2016/0188320 A1 | 6/2016 | Chang et al. |
| 2016/0191306 A1 | 6/2016 | Gasparakis et al. |
| 2016/0191361 A1 | 6/2016 | Behera et al. |
| 2016/0191370 A1 | 6/2016 | Wood |
| 2016/0191384 A1 | 6/2016 | Shelar et al. |
| 2016/0191406 A1 | 6/2016 | Xiao et al. |
| 2016/0191530 A1 | 6/2016 | Jain et al. |
| 2016/0197852 A1 | 7/2016 | Hutchison et al. |
| 2016/0212012 A1 | 7/2016 | Young et al. |
| 2016/0232019 A1 | 8/2016 | Shah et al. |
| 2016/0234067 A1 | 8/2016 | Dolganow et al. |
| 2016/0234097 A1 | 8/2016 | Chang |
| 2016/0234102 A1 | 8/2016 | Kotalwar et al. |
| 2016/0234103 A1 | 8/2016 | Kotalwar et al. |
| 2016/0234112 A1* | 8/2016 | Anand ................... H04L 45/38 |
| 2016/0241459 A1 | 8/2016 | Zheng et al. |
| 2016/0301601 A1 | 10/2016 | Anand et al. |
| 2016/0315866 A1 | 10/2016 | Thapar et al. |
| 2016/0323243 A1 | 11/2016 | Levasseur et al. |
| 2016/0330127 A1 | 11/2016 | Kim et al. |
| 2016/0330128 A1 | 11/2016 | Wang |
| 2016/0337329 A1 | 11/2016 | Sood et al. |
| 2016/0342510 A1 | 11/2016 | Pani |
| 2016/0344629 A1 | 11/2016 | Gray |
| 2016/0357534 A1 | 12/2016 | Krishnamoorthi et al. |
| 2016/0359685 A1 | 12/2016 | Yadav et al. |
| 2017/0005951 A1 | 1/2017 | Labonte et al. |
| 2017/0013452 A1 | 1/2017 | Mentze et al. |
| 2017/0019302 A1 | 1/2017 | Lapiotis et al. |
| 2017/0019329 A1 | 1/2017 | Kozat et al. |
| 2017/0034082 A1 | 2/2017 | Pfaff |
| 2017/0041209 A1 | 2/2017 | Joshi et al. |
| 2017/0048144 A1 | 2/2017 | Liu |
| 2017/0053012 A1 | 2/2017 | Levy et al. |
| 2017/0063690 A1 | 3/2017 | Bosshart |
| 2017/0064047 A1 | 3/2017 | Bosshart |
| 2017/0070416 A1 | 3/2017 | Narayanan et al. |
| 2017/0075692 A1 | 3/2017 | Naresh et al. |
| 2017/0085414 A1 | 3/2017 | Castaldelli et al. |
| 2017/0085477 A1 | 3/2017 | Li et al. |

(56) References Cited

U.S. PATENT DOCUMENTS

| | | |
|---|---|---|
| 2017/0085479 A1 | 3/2017 | Wang et al. |
| 2017/0091258 A1 | 3/2017 | Rajahalme |
| 2017/0093707 A1 | 3/2017 | Kim et al. |
| 2017/0093986 A1 | 3/2017 | Kim et al. |
| 2017/0093987 A1 | 3/2017 | Kaushalram et al. |
| 2017/0111275 A1 | 4/2017 | Li et al. |
| 2017/0118041 A1 | 4/2017 | Bhattacharya et al. |
| 2017/0118042 A1 | 4/2017 | Bhattacharya et al. |
| 2017/0126588 A1 | 5/2017 | Anand et al. |
| 2017/0134282 A1 | 5/2017 | Agarwal et al. |
| 2017/0134310 A1 | 5/2017 | Koladi et al. |
| 2017/0142000 A1 | 5/2017 | Cai et al. |
| 2017/0142011 A1 | 5/2017 | Zhang et al. |
| 2017/0149632 A1 | 5/2017 | Saltsidis et al. |
| 2017/0180273 A1 | 6/2017 | Daly et al. |
| 2017/0195229 A1 | 7/2017 | Ulas et al. |
| 2017/0208015 A1 | 7/2017 | Volkening et al. |
| 2017/0220499 A1 | 8/2017 | Gray |
| 2017/0222881 A1 | 8/2017 | Holbrook et al. |
| 2017/0223575 A1 | 8/2017 | Duda et al. |
| 2017/0251077 A1 | 8/2017 | Eerpini et al. |
| 2017/0257684 A1 | 9/2017 | Anand et al. |
| 2017/0264571 A1 | 9/2017 | Aibester et al. |
| 2017/0289034 A1 | 10/2017 | Bosshart et al. |
| 2018/0006945 A1 | 1/2018 | Flajslik et al. |
| 2018/0006950 A1 | 1/2018 | Flajslik et al. |
| 2018/0054385 A1 | 2/2018 | Dharmapurikar et al. |
| 2018/0103060 A1 | 4/2018 | Li et al. |
| 2018/0115478 A1 | 4/2018 | Kim et al. |
| 2018/0124183 A1 | 5/2018 | Kozat et al. |
| 2018/0191640 A1 | 7/2018 | Calderon et al. |
| 2018/0234340 A1 | 8/2018 | Kim et al. |
| 2018/0234355 A1 | 8/2018 | Kim et al. |
| 2018/0262424 A1 | 9/2018 | Roeland et al. |
| 2018/0287819 A1 | 10/2018 | Mayer-Wolf et al. |
| 2018/0316549 A1 | 11/2018 | Gasparakis et al. |
| 2018/0375755 A1 | 12/2018 | Joshi et al. |
| 2019/0394086 A1 | 12/2019 | Gasparakis et al. |
| 2020/0007473 A1 | 1/2020 | Kim et al. |
| 2020/0021486 A1 | 1/2020 | Gasparakis et al. |
| 2020/0076737 A1 | 3/2020 | Bosshart |
| 2020/0084093 A1 | 3/2020 | Gasparakis et al. |
| 2020/0099617 A1 | 3/2020 | Bosshart |
| 2020/0099618 A1 | 3/2020 | Bosshart |
| 2020/0099619 A1 | 3/2020 | Bosshart |
| 2020/0228433 A1 | 7/2020 | Lee |
| 2020/0244576 A1 | 7/2020 | Wetterwald et al. |
| 2020/0267098 A1 | 8/2020 | Galles |
| 2020/0280428 A1 | 9/2020 | Kovacs et al. |
| 2020/0280518 A1 | 9/2020 | Lee et al. |
| 2020/0314219 A1 | 10/2020 | Watson et al. |
| 2022/0091992 A1 | 3/2022 | Shanbhogue et al. |
| 2023/0231818 A1 | 7/2023 | Galles et al. |
| 2024/0080276 A1 | 3/2024 | Agrawal et al. |

FOREIGN PATENT DOCUMENTS

| | | |
|---|---|---|
| EP | 3229424 | 10/2017 |
| JP | 2015080175 | 4/2015 |
| JP | 6127900 | 5/2017 |
| WO | 2013101024 | 7/2013 |
| WO | 2017112165 | 6/2017 |

OTHER PUBLICATIONS

Advisory Action for U.S. Appl. No. 15/888,054, dated Feb. 10, 2020.

Final Office Action for U.S. Appl. No. 15/784,191, dated Feb. 26, 2021.

Final Office Action for U.S. Appl. No. 15/784,191, dated May 7, 2020, 13 pages.

Final Office Action for U.S. Appl. No. 15/784,192, dated Jun. 1, 2020, 14 pages.

Final Office Action for U.S. Appl. No. 15/888,050, dated Dec. 12, 2019.

Final Office Action for U.S. Appl. No. 15/888,054, dated Sep. 18, 2019.

Final Office Action for U.S. Appl. No. 16/695,044, dated Dec. 20, 2021.

Final Office Action for U.S. Appl. No. 16/804,960, dated Apr. 14, 2022.

Final Office Action for U.S. Appl. No. 17/134,110 dated Oct. 25, 2022.

International Preliminary Report on Patentability for PCT Application No. PCT/US2016/062511, dated Jun. 26, 2018.

International Search Report and Written Opinion for PCT Application No. PCT/US2016/062511, dated Feb. 28, 2017.

Non-Final Office Action for U.S. Appl. No. 16/569,554, dated Feb. 19, 2021.

Non-Final Office Action from U.S. Appl. No. 17/837,864 notified Mar. 16, 2023, 18 pgs.

Non-Published commonly owned U.S. Appl. No. 15/678,549, filed Aug. 16, 2017, 41 pages, Barefoot Networks, Inc.

Non-Published Commonly Owned U.S. Appl. No. 15/784,191, filed Oct. 16, 2017, 36 pages, Barefoot Networks, Inc.

Non-Published commonly owned U.S. Appl. No. 16/288,074, filed Feb. 27, 2019, 47 pages, Barefoot Networks, Inc.

Non-Published Commonly Owned U.S. Appl. No. 15/784,192, filed Oct. 16, 2017, 36 pages, Barefoot Networks, Inc.

Non-Published commonly owned U.S. Appl. No. 15/678,556, filed Aug. 16, 2017, 42 pages, Barefoot Networks, Inc.

Non-Published commonly owned U.S. Appl. No. 15/678,565, filed Aug. 16, 2017, 42 pages.

Non-Published commonly owned U.S. Appl. No. 15/729,555, filed Oct. 10, 2017, 40 pages, Barefoot Networks, Inc.

Non-Published commonly owned U.S. Appl. No. 15/729,593, filed Oct. 10, 2017, 40 pages, Barefoot Networks, Inc.

Non-Published Commonly Owned U.S. Appl. No. 15/784,190, filed Oct. 16, 2017.

Non-Published commonly owned U.S. Appl. No. 15/835,233, dated Dec. 7, 2017, 36 pages, Barefoot Networks, Inc.

Non-Published commonly owned U.S. Appl. No. 15/835,235, dated Dec. 7, 2017, 36 pages, Barefoot Networks, Inc.

Non-Published commonly owned U.S. Appl. No. 15/835,238, filed Dec. 7, 2017, 69 pages, Barefoot Networks, Inc.

Non-Published commonly owned U.S. Appl. No. 15/835,239, filed Dec. 7, 2017, 69 pages, Barefoot Networks, Inc.

Non-Published commonly owned U.S. Appl. No. 15/835,242, filed Dec. 7, 2017, 69 pages, Barefoot Networks, Inc.

Non-Published commonly owned U.S. Appl. No. 15/835,247, filed Dec. 7, 2017, 68 pages, Barefoot Networks, Inc.

Non-Published commonly owned U.S. Appl. No. 15/835,249, filed Dec. 7, 2017, 69 pages, Barefoot Networks, Inc.

Non-Published commonly owned U.S. Appl. No. 15/835,250, filed Dec. 7, 2017, 68 pages, Barefoot Networks, Inc.

Notice of Allowance for Chinese Patent Application No. 201680075637.4, dated Apr. 1, 2022.

Notice of Allowance for U.S. Appl. No. 14/583,664, dated Feb. 28, 2018.

Notice of Allowance for U.S. Appl. No. 14/836,850, dated Jun. 20, 2017.

Notice of Allowance for U.S. Appl. No. 14/836,855, dated Jun. 30, 2017.

Notice of Allowance for U.S. Appl. No. 14/977,810, dated Oct. 20, 2017.

Notice of Allowance for U.S. Appl. No. 15/678,549, dated Apr. 8, 2020.

Notice of Allowance for U.S. Appl. No. 15/678,549, dated Dec. 27, 2019.

Notice of Allowance for U.S. Appl. No. 15/678,556, dated Feb. 4, 2020.

Notice of Allowance for U.S. Appl. No. 15/678,565, dated Feb. 12, 2020.

Notice of Allowance for U.S. Appl. No. 15/729,555, dated May 2, 2019.

(56) References Cited

OTHER PUBLICATIONS

Notice of Allowance for U.S. Appl. No. 15/729,593, dated Nov. 15, 2018.
Notice of Allowance for U.S. Appl. No. 15/784,190, dated May 10, 2019, 20 pages.
Notice of Allowance for U.S. Appl. No. 15/784,191, dated Apr. 19, 2019, 7 pages.
Notice of Allowance for U.S. Appl. No. 15/784,191, dated Aug. 21, 2019, 8 pages.
Notice of Allowance for U.S. Appl. No. 15/784,191, dated Aug. 31, 2021.
Notice of Allowance for U.S. Appl. No. 15/784,191, dated May 5, 2021.
Notice of Allowance for U.S. Appl. No. 15/784,192, mailed Mar. 17, 2021.
Notice of Allowance for U.S. Appl. No. 15/784,192, dated Jun. 30, 2021.
Notice of Allowance for U.S. Appl. No. 15/784,192, dated Sep. 30, 2021.
Notice of Allowance for U.S. Appl. No. 15/835,233, dated Jul. 3, 2019, 8 pages.
Notice of Allowance for U.S. Appl. No. 15/835,233, dated Oct. 29, 2019.
Notice of Allowance for U.S. Appl. No. 15/835,235, dated Apr. 24, 2020.
Notice of Allowance for U.S. Appl. No. 15/835,235, dated Aug. 20, 2019, 16 pages.
Notice of Allowance for U.S. Appl. No. 15/835,238, dated Sep. 30, 2020.
Notice of Allowance for U.S. Appl. No. 15/835,239, dated Nov. 13, 2019, 10 pages.
Notice of Allowance for U.S. Appl. No. 15/835,242, dated Jun. 24, 2020.
Notice of Allowance for U.S. Appl. No. 15/835,242, dated Jul. 1, 2019, 7 pages.
Notice of Allowance for U.S. Appl. No. 15/835,247 dated Dec. 29, 2021.
Notice of Allowance for U.S. Appl. No. 15/835,247, dated Apr. 7, 2022.
Notice of Allowance for U.S. Appl. No. 15/835,247, dated Jul. 29, 2022.
Notice of Allowance for U.S. Appl. No. 15/835,249, dated Jul. 25, 2019.
Notice of Allowance for U.S. Appl. No. 15/835,250, dated Jul. 25, 2019, 17 pages.
Notice of Allowance for U.S. Appl. No. 15/878,966, dated May 15, 2019.
Notice of Allowance for U.S. Appl. No. 16/026,318, dated Mar. 12, 2019.
Notice of Allowance for U.S. Appl. No. 16/460,798, dated May 27, 2021.
Notice of Allowance for U.S. Appl. No. 16/519,873, dated Aug. 30, 2021.
Notice of Allowance for U.S. Appl. No. 16/519,873, dated Dec. 3, 2021.
Notice of Allowance for U.S. Appl. No. 16/519,873, dated Mar. 17, 2022.
Notice of Allowance for U.S. Appl. No. 16/573,847, dated Apr. 14, 2022.
Notice of Allowance for U.S. Appl. No. 16/573,847, dated Dec. 15, 2021.
Notice of Allowance for U.S. Appl. No. 16/582,798, dated Aug. 27, 2021.
Notice of Allowance for U.S. Appl. No. 16/582,798, dated Dec. 1, 2021.
Notice of Allowance for U.S. Appl. No. 16/582,798, dated Mar. 22, 2022.
Notice of Allowance for U.S. Appl. No. 16/687,271, dated Aug. 30, 2021.
Notice of Allowance for U.S. Appl. No. 16/687,271, dated Dec. 1, 2021.
Notice of Allowance for U.S. Appl. No. 16/687,271, dated Mar. 22, 2022.
Notice of Allowance for U.S. Appl. No. 16/695,044 dated Apr. 27, 2022.
Notice of Allowance for U.S. Appl. No. 16/695,049, dated Apr. 28, 2022.
Notice of Allowance for U.S. Appl. No. 16/695,049, dated Jan. 5, 2022.
Notice of Allowance for U.S. Appl. No. 16/789,339, dated Jul. 29, 2021.
Notice of Allowance for U.S. Appl. No. 16/879,704, dated Apr. 26, 2022.
Notice of Allowance for U.S. Appl. No. 17/318,890, dated Jun. 8, 2022.
Notice of Allowance for U.S. Appl. No. 17/318,890, dated Mar. 3, 2022.
Notice of Allowance for U.S. Appl. No. 17/484,004, dated Feb. 15, 2023.
Notice of Allowance for U.S. Appl. No. 17/494,515, dated Feb. 28, 2023.
Notice of Allowance for U.S. Appl. No. 17/867,508, dated Nov. 14, 2022.
Notice of Allowance from U.S. Appl. No. 17/134,110 notified Apr. 26, 2023, 9 pgs.
Office Action for Chinese Patent Application No. 201680075637.4, dated Mar. 2, 2021.
Office Action for Chinese Patent Application No. 201680075637.4, dated Sep. 23, 2021.
Office Action for U.S. Appl. No. 15/878,966, dated Jan. 11, 2019.
Office Action for U.S. Appl. No. 14/583,664, dated Feb. 27, 2017.
Office Action for U.S. Appl. No. 14/583,664, dated Jul. 28, 2016.
Office Action for U.S. Appl. No. 14/583,664, dated Oct. 18, 2017.
Office Action for U.S. Appl. No. 14/863,961, dated Jun. 16, 2017.
Office Action for U.S. Appl. No. 14/864,032, dated Feb. 14, 2017.
Office Action for U.S. Appl. No. 14/977,810, dated Jun. 29, 2017.
Office Action for U.S. Appl. No. 15/678,549, dated Feb. 26, 2019.
Office Action for U.S. Appl. No. 15/678,549, dated Jul. 30, 2019.
Office Action for U.S. Appl. No. 15/678,556, dated Jun. 19, 2019.
Office Action for U.S. Appl. No. 15/678,565, dated Jun. 13, 2019.
Office Action for U.S. Appl. No. 15/729,593, dated Aug. 10, 2018.
Office Action for U.S. Appl. No. 15/784,191, dated Aug. 26, 2020, 14 pages.
Office Action for U.S. Appl. No. 15/784,191, dated Dec. 19, 2018, 11 pages.
Office Action for U.S. Appl. No. 15/784,191, dated Jan. 24, 2020, 12 pages.
Office Action for U.S. Appl. No. 15/784,192, dated Sep. 19, 2019, 14 pages.
Office Action for U.S. Appl. No. 15/835,233, dated Feb. 8, 2019, 17 pages.
Office Action for U.S. Appl. No. 15/835,235, dated Feb. 25, 2019, 24 pages.
Office Action for U.S. Appl. No. 15/835,238, dated Dec. 11, 2019.
Office Action for U.S. Appl. No. 15/835,238, dated Feb. 7, 2019.
Office Action for U.S. Appl. No. 15/835,238, dated Jun. 19, 2019.
Office Action for U.S. Appl. No. 15/835,238, dated Jun. 5, 2020.
Office Action for U.S. Appl. No. 15/835,239, dated Feb. 7, 2019, 20 pages.
Office Action for U.S. Appl. No. 15/835,239, dated Jun. 19, 2019, 18 pages.
Office Action for U.S. Appl. No. 15/835,242, dated Oct. 18, 2019, 8 pages.
Office Action for U.S. Appl. No. 15/835,247, dated Dec. 31, 2018, 18 pages.
Office Action for U.S. Appl. No. 15/835,247, dated Jul. 10, 2019.
Office Action for U.S. Appl. No. 15/835,249, dated Dec. 31, 2018.
Office Action for U.S. Appl. No. 15/835,250, dated Apr. 4, 2019, 16 pages.
Office Action for U.S. Appl. No. 15/835,393, dated Jan. 7, 2021.
Office Action for U.S. Appl. No. 15/888,050, dated Jun. 11, 2019.
Office Action for U.S. Appl. No. 15/888,054, dated Mar. 11, 2019.

(56) References Cited

OTHER PUBLICATIONS

Office Action for U.S. Appl. No. 16/026,318, dated Sep. 20, 2018.
Office Action for U.S. Appl. No. 16/288,074, dated Oct. 7, 2020.
Office Action for U.S. Appl. No. 16/288,074, dated Mar. 5, 2020.
Office Action for U.S. Appl. No. 16/4670,798, dated Nov. 18, 2020.
Office Action for U.S. Appl. No. 16/519,873, dated Jun. 11, 2021.
Office Action for U.S. Appl. No. 16/569,554, dated Aug. 18, 2020.
Office Action for U.S. Appl. No. 16/569,554, dated Jul. 2, 2021.
Office Action for U.S. Appl. No. 16/569,554, dated Mar. 14, 2022.
Office Action for U.S. Appl. No. 16/569,554, dated Sep. 27, 2021.
Office Action for U.S. Appl. No. 16/573,847 dated Jan. 6, 2021.
Office Action for U.S. Appl. No. 16/573,847, dated Aug. 2, 2021.
Office Action for U.S. Appl. No. 16/582,798, dated Jun. 24, 2021.
Office Action for U.S. Appl. No. 16/687,271, dated Jun. 24, 2021.
Office Action for U.S. Appl. No. 16/695,044, dated Jul. 8, 2021.
Office Action for U.S. Appl. No. 16/695,049, dated Jul. 21, 2021.
Office Action for U.S. Appl. No. 16/695,053 dated Aug. 4, 2021.
Office Action for U.S. Appl. No. 16/695,053 dated Jan. 5, 2022.
Office Action for U.S. Appl. No. 16/695,053, dated May 11, 2022.
Office Action for U.S. Appl. No. 16/695,053, dated Oct. 14, 2022.
Office Action for U.S. Appl. No. 16/804,960, dated Aug. 19, 2021.
Office Action for U.S. Appl. No. 16/804,960, dated Dec. 13, 2021.
Office Action for U.S. Appl. No. 16/804,960, dated May 12, 2021.
Office Action for U.S. Appl. No. 17/134,110, dated Dec. 22, 2022.
Office Action for U.S. Appl. No. 17/134,110, dated Jun. 24, 2022.
Office Action for U.S. Appl. No. 17/484,004, dated Oct. 27, 2022.
Office Action for U.S. Appl. No. 17/570,994, dated Mar. 2, 2023.
Office Action for U.S. Appl. No. 17/859,722, dated Mar. 28, 2023.
Office Action for U.S. Appl. No. 17/859,722, dated Oct. 26, 2022.
Office Action in Chinese Patent Application No. 201680075637.4, dated Jan. 5, 2022.
"Selection of Cyclic Redundancy Code and Checksum Algorithms to Ensure Critical Data Integrity", Federal Aviation Administration William J. Hughes Technical Center Aviation Research Division Atlantic City International Airport New Jersey 08405, DOT/FAA/TC-14/49, Mar. 2015, 111 pages.
Arashloo, Mina Tahmasbi, et al., "SNAP: Stateful Network-Wide Abstractions for Packet Processing", SIGCOMM '16, Aug. 22-26, 2016, 27 pages, ACM, Florianopolis, Brazil.
Bosshart, P., et al., "Forwarding Metamorphosis: Fast Programmable Match-Action Processing in Hardware or SDN", SIGCOMM'13, Aug. 12-16, 2013, 12 pages, ACM, Hong Kong, China.
Kaufmann, A., et al., "High Performance Packet Processing with FlexNIC", ASPLOS'16, Apr. 2-6, 2016, 15 pages, ACM, Atlanta, GA, USA.
Moshref, Masoud, et al., "Flow-level State Transition as a New Switch Primitive for SON", HotSDN'14, Aug. 22, 2014, 6 pages, ACM, Chicago, IL, USA.
Sivaraman, A., et al., "Towards Programmable Packet Scheduling", HotNets'15, Nov. 16-17, 2015, 7 pages, ACM, Philadelphia, PA, USA.
Sivaraman, Anirudh, et al., "Packet Transactions: A Programming Model for Data-Plane Algorithms at Hardware Speed", arXiv:1512.05023v1, Dec. 16, 2015, 22 pages.
Sivaraman, Anirudh, et al., "Packet Transactions: High-level Programming for Line-Rate Switches", ?rXiv:1512.05023v2, Jan. 30, 2016, 16 pages.
Sivaraman, Anirudh, et al., "Packet Transactions: High-level Programming for Line-Rate Switches", SIGCOMM'16, Aug. 22-26, 2016, 14 pages, ACM, Florianopolis, Brazil.
Sivaraman, Anirudh, et al., "Programmable Packet Scheduling at Line Rate", SIGCOMM'16, Aug. 22-26, 2016, 14 pages, ACM, Florianopolis, Brazil.
Song, "Protocol-Oblivious Forwarding: Unleashe the Power of SDN through a Future-Proof Forwarding Plane", Huawei Technologies, USA, 6 pages.
Non-Final Office Action from U.S. Appl. No. 18/214,665 notified Feb. 1, 2024, 9 pgs.
Notice of Allowance from Chinese Patent Application No. 202111206815.1 notified Mar. 19, 2024, 6 pgs.
Notice of Allowance from Chinese Patent Application No. 202111494631.X notified Jan. 2, 2024, 4 pgs.
Notice of Allowance from U.S. Appl. No. 17/837,864 notified Jun. 20, 2024, 18 pgs.
Notice of Allowance from U.S. Appl. No. 17/837,864 notified Mar. 1, 2024, 18 pgs.
Notice of Allowance from U.S. Appl. No. 17/859,722 notified Aug. 9, 2023, 9 pgs.
Notice of Allowance from U.S. Appl. No. 18/077,543 notified Apr. 8, 2024, 13 pgs.
Notice of Allowance from U.S. Appl. No. 18/077,543 notified Jul. 24, 2024, 13 pgs.
Notice of Allowance from U.S. Appl. No. 18/130,733 notified May 16, 2024, 13 pgs.
Notice of Allowance from U.S. Appl. No. 18/130,733 notified Feb. 7, 2024, 14 pgs.
Notice of Allowance from U.S. Appl. No. 17/859,722 notified Dec. 12, 2023, 16 pgs.
Notice of Allowance from U.S. Appl. No. 18/214,665 notified May 8, 2024, 43 pgs.
Non-Final Office Action from U.S. Appl. No. 17/860,879 notified Sep. 6, 2024, 92 pgs.
Non-Final Office Action from U.S. Appl. No. 18/201,060 notified Sep. 16, 2024, 50 pgs.
Notice of Allowance from U.S. Appl. No. 18/077,543 notified Nov. 19, 2024, 14 pgs.
Final Office Action from U.S. Appl. No. 17/860,879 notified Dec. 26, 2024, 68 pgs.
Final Office Action from U.S. Appl. No. 18/201,060 notified Jan. 17, 2025, 26 pgs.
Non-Final Office Action from U.S. Appl. No. 18/495,590 notified Dec. 23, 2024, 81 pgs.
Non-Final Office Action from U.S. Appl. No. 18/734,862 notified Mar. 13, 2025, 45 pgs.
Notice of Allowance from U.S. Appl. No. 17/860,879 notified Apr. 9, 2025, 20 pgs.
Notice of Allowance from U.S. Appl. No. 18/201,060 notified Apr. 2, 2025, 7 pgs.
Notice of Allowance from U.S. Appl. No. 18/495,590 notified May 16, 2025, 104 pgs.

* cited by examiner

CONFIGURING A SWITCH FOR EXTRACTING PACKET HEADER FIELDS

CLAIM OF PRIORITY

This application is a continuation of, and claims the benefit of priority to, prior co-pending U.S. patent application Ser. No. 17/570,994, filed Jan. 7, 2022 and titled "CONFIGURING A SWITCH FOR EXTRACTING PACKET HEADER FIELDS," which is a continuation of prior U.S. patent application Ser. No. 16/288,074, filed Feb. 27, 2019 and titled "CONFIGURING A SWITCH FOR EXTRACTING PACKET HEADER FIELDS," which is a continuation of prior U.S. patent application Ser. No. 15/729,593, filed Oct. 10, 2017 and titled "CONFIGURING A SWITCH FOR EXTRACTING PACKET HEADER FIELDS," which is a continuation of prior U.S. patent application Ser. No. 14/836,855, filed Aug. 26, 2015 and titled "CONFIGURING A SWITCH FOR EXTRACTING PACKET HEADER FIELDS." Each of the aforesaid prior U.S. Patent Applications is hereby incorporated herein by reference in its entirety.

BACKGROUND

In Software Defined Networking (SDN), the control plane is physically separated from the forwarding plane and communicates with the forwarding plane through an interface (e.g., the OpenFlow protocol). OpenFlow is an evolving networking standard that uses a match-action paradigm for network packet switching. The typical hardware switches that were (and still are) used to implement the match-action paradigm, however, are not quite flexible since they process only a fixed set of fields with a limited repertoire of packet processing actions. A reconfigurable match table (RMT) architecture that overcomes the aforementioned shortcomings has recently been introduced to the market. This new architecture could be improved to make the hardware switch operate more efficiently.

SUMMARY

Some embodiments provide a novel packet processing pipeline that enhances the match-action packet header processing performed by reconfigurable hardware switches. The hardware switch of some embodiments includes, among other elements, an ingress pipeline and an egress pipeline. Each pipeline includes a parser, a match-action unit (MAU), and a deparser. In some embodiments, for each packet that is processed by the switch, the parser separates the packet header data (e.g., Ethernet headers, IPv4 headers, TCP headers, etc.) from the payload of the packet and determines which fields of each packet header (e.g., source port address of the TCP header, destination port address of the TCP header, etc.) might be processed by the MAU. The parser of some such embodiments (1) populates a primary packet header vector (PPHV) with only the fields of the different headers that may be used by the MAU, and (2) populates a secondary packet header vector (SPHV) with the rest of the fields of the different headers (i.e., the fields that will not be processed by the MAU). In some embodiments, the PPHV and SPHV each includes a set of registers that stores the packet header fields during processing by the MAU.

In some embodiments, the parser delivers the populated PPHV to the MAU, which includes a set of match-action stages for matching the different header fields of the packet against the different match tables and applying the required actions to the packet by modifying the packet header data (e.g., assigning the packet to an output port and queue, sending the packet to a network controller, dropping the packet, etc.). The parser of some such embodiments also delivers the populated SPHV directly to the deparser (without having the MAU process the SPHV) along with the payload of the packet.

In some embodiments, after the different packet headers are processed by the MAU, the deparser reassembles the packet with (1) the processed header data (e.g., modified header fields) of the PPHV that the deparser receives from the MAU, (2) the unprocessed header data stored in the SPHV that the deparser receives from the parser directly, and (3) the payload of the packet that the deparser also receives from the parser. After reassembling the packet, if the packet is reassembled by an ingress deparser, the deparser sends the packet to a queuing system to be subsequently forwarded to the egress pipeline of the switch. On the other hand, if the packet is reassembled by an egress deparser, the deparser sends the packet (with a header that might or might not have been modified) out of the switch.

The parser of some embodiments determines which fields of each packet header may be processed and which fields will not be processed by the MAU, based on the information the parser receives from the packet headers themselves (e.g., the EtherType field of the packet, etc.), and based on configuration data received from the control plane. In some embodiments, a compiler in the control plane receives the data required for configuring the pipeline (e.g., through a programing language code), generates a set of configuration data, and distributes the generated data to a configurator module (also part of the control plane). The configurator module then distributes the configuration data to both the parser and MAU of the pipeline in the switch.

The parser of some embodiments, based on the information it receives from the configurator, determines which sets of packet headers to extract from the packet and how to extract these packet headers. The parser analyzes the packet headers as it extracts them according to the configuration data configured by the control plane. This configuration data represents a parse graph that identifies how to parse the packet based on values of certain packet header fields as well as table flow and control flow graphs used to generate the configuration data for the MAU, which describe how packets will be processed through the stages of the MAU. Based on the configuration data and the values of certain packet header fields, the parser determines iteratively (i) whether each packet header field should be placed in the PPHV or the SPHV and (ii) how to extract the next set of packet header fields. For instance, the EtherType field of the layer 2 header of some embodiments specifies how to extract the layer 3 header (e.g., whether the packet is IPv4 or IPv6, etc.).

Separating the fields that may be processed by the MAU from the rest of the fields in each packet header improves the overall efficiency of the switch in many ways. For instance, this separation helps avoid wasting the valuable resources of the MAU by enabling these resources to only (or primarily) process data that is actually needed for making the packet processing determinations. For example, a TCP packet header typically has a minimum length of five words (twenty bytes). In many cases, the MAU of the pipeline processes only four bytes of the TCP header bytes (i.e., the source and destination port addresses) and the rest of the fields in the TCP header (sixteen bytes) are not used by any of the stages of the MAU. In such cases, by separating the unused data from useful data, the parser does not waste any of the valuable resources of the MAU to process the other sixteen bytes of the TCP header.

In addition, separating the PPHV from the SPHV enables the parser to parse deeper into packets while sending the same amount of data to the MAU (via the PPHV). While using a single PPHV of a fixed size only allows the parser to extract the packet headers up to a certain point (the size of the PPHV), sending some of the unused fields into the SPHV allows the PPHV to carry only the more useful fields, and include deeper packet headers. For example, newer tunneling protocols such as GENEVE add variable length option fields to the packet header, and may be quite long. Similarly, packets sent using multi-layer tunneling may have significant amounts of packet header data that may need to be extracted in order to reach the layer 4 (e.g., TCP) data. By sending the fields that will not be processed by the MAU to the SPHV, the PPHV can include packet header fields that are located deeper into the packet, without sending additional data to the MAU.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for the purpose of explanation. However, one of ordinary skill in the art will realize that the invention may be practiced without the use of these specific details. In other instances, well-known structures and devices are shown in block diagram form in order not to obscure the description of the invention with unnecessary detail.

Some embodiments provide a novel packet processing pipeline that enhances the match-action packet header processing performed by reconfigurable hardware switches. The hardware switch of some embodiments includes, among other elements, an ingress pipeline and an egress pipeline. Each of these pipelines includes a parser, a match-action unit (MAU), and a deparser.

Figure 1:
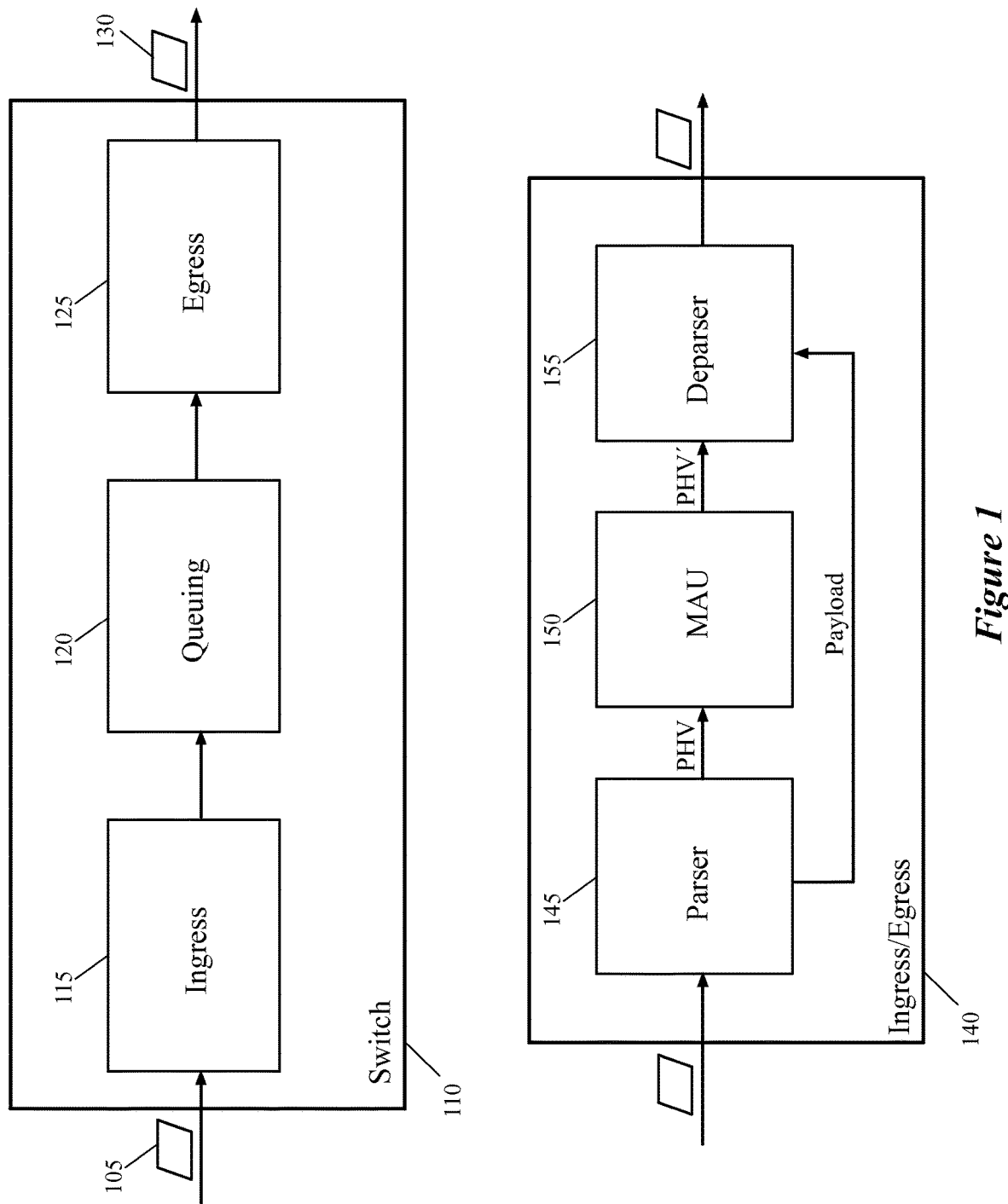
FIG. 1 illustrates a block diagram of a hardware switch and a block diagram of an ingress/egress interface of the hardware switch.

FIG. 1 illustrates a block diagram of a hardware switch 110 and a block diagram of an ingress/egress pipeline of the hardware switch. More specifically, the hardware switch 110 includes an ingress pipeline (datapath) 115, a queuing system (e.g., a data buffer) 120, and an egress pipeline 125. The ingress pipeline 115 of some embodiments receives a packet 105 (e.g., through an I/O module), parses the packet into a packet header vector (PHV), sends the PHV through a set of match and action stages which may modify the PHV, deparses the packet headers back from the PHV into packet format, and enqueues the packet in a centralized data buffer (i.e., the data buffer 120). Each one of the aforementioned operations is described in more detail below by reference to the ingress/egress pipeline 140.

In some embodiments the queuing system 120 receives the packets that are processed by the ingress pipeline and provides a large shared buffer (storage) that accommodates the queuing delays due to oversubscription of the output channels of the ingress deparser. In some embodiments, the data buffer stores packet data, while pointers to that data are kept in different queues per channel. Each channel in turn requests data from the common data buffer using a configurable queuing policy. When pointers to packets reach the head of the queues, the packets are read out of the data buffer 120 into the egress interface 125.

Similar to the ingress interface 115, the egress interface 125 of some embodiments receives the packet from the queuing system 120, separates the packet payload from the packet headers, stores the packets headers in a PHV, sends the PHV through an ingress pipeline of match and action stages, deparses the packet headers back from the PHV into packet format, and sends the packet 130 to an appropriate output port of the switch 110 to be driven off the switch (e.g., through one of the output channels). The output packet 130 may be the same packet as the input packet 105 (i.e., with identical packet headers), or it may have different packet headers compared to the input packet 105 based on the actions that are applied to the packet headers in the ingress and egress pipelines (e.g., different header field values for certain header fields and/or different sets of header fields).

One of ordinary skill in the art would realize that the illustrated blocks in switch 110 are exemplary only. The ingress, queuing, and egress blocks are simplified for simplicity of the description. For example, although the figure shows only one entry point to the ingress parser and one exit point from the egress deparser, in some embodiments the input signals are received by many different input channels (e.g., 64 channels) and the output signals are sent out of the switch from different output channels (e.g., 64 channels). Additionally, although for the illustrated switch only one parser interface is shown for the ingress/egress pipeline 140, some embodiments employ numerous parser blocks (e.g., 16 parser blocks) that feed the match-action unit (MAU) in each pipeline.

FIG. 1 also shows a block diagram 140 of an ingress/egress interface of the hardware switch 110. The interface includes a pipeline with three different units, namely a parser unit 145, a match-action unit (MAU) 150, and a deparser unit 155. The parser 145 of some embodiments receives the incoming packet data and produces a PHV as its output. In other words, the parser 145 separates the packet headers from the packet payload by extracting the different packet headers and storing them in the PHV. In some embodiments the PHV includes a set of different size registers or containers. For instance, in some embodiments the PHV includes sixty-four 8-bit registers, ninety-six 16-bit registers, and sixty-four 32-bit registers (for a total of 224 registers containing 4096 bits), though other embodiments may have any different numbers of registers of different sizes. In some embodiments, the parser 145 stores each extracted packet header in a particular subset of one ore more registers of the PHV. For example, the parser might store a first header field in one 16-bit register and a second header field in a combination of an 8-bit register and a 32-bit register (e.g., if the header field is 36 bits long).

The PHV provides the input data to the match tables of the MAU. In some embodiments the MAU 150 includes a set of match-action stages (e.g., 32 match-action stages in some embodiments), each of which matches a particular set of header fields against a match table and takes an action based on the result of the match (e.g., assigning the packet to an output port and queue, dropping the packet, modifying one or more of the header fields, etc.). The MAU 150 and its different match-action stages are described in more detail below by reference to FIG. 3. Based on the actions taken on different header data during the different stages of the MAU 150, the PHV that the MAU outputs might include the same header data as the PHV that the MAU received from the parser, or the output PHV might contain different data than the input PPHV.

The output PHV is then handed to the deparser 155. In some embodiments, the deparser 155 reassembles the packet by putting back together the output PHV (that might or might not have been modified) that the deparser receives from the MAU 150 and the payload of the packet that the deparser receives directly from the parser 145 in some embodiments. The deparser then sends the packet out of the ingress/egress pipeline (to the queuing system 120 or out of the switch, depending on whether it is the deparser for the ingress pipeline or the egress pipeline).

Figure 2:
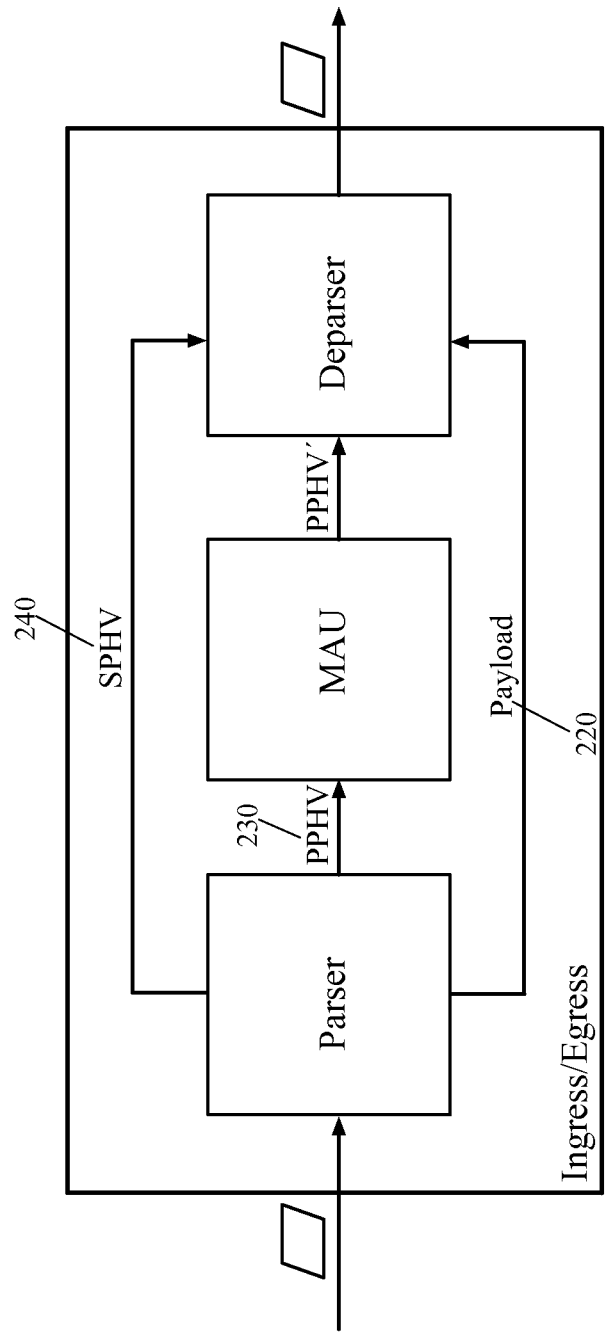
FIG. 2 illustrates a block diagram that shows that the parser produces a secondary packet header vector (SPHV), besides the primary packet header vector (PPHV), that bypasses the MAU and is directly delivered to the deparser.

FIG. 2 illustrates a block diagram similar to the block diagram 140 of FIG. 1, except that this figure shows that the parser also produces a secondary packet header vector (SPHV), or tag-along PHV, that bypasses the MAU's pipeline and is directly delivered to the deparser. More specifically, after receiving a packet, the parser 145 of some embodiments produces two different packet header vectors, a PPHV and a SPHV, as its output.

As described above, in some embodiments, for each packet that is processed by the switch, the parser separates the packet header data (e.g., Ethernet, IPv4, TCP, etc.) from the payload 220 of the packet and determines which fields of each packet header (e.g., source port address of the TCP header, destination port address of the TCP header, etc.) may be processed by the MAU (i.e., might be matched against, or might be modified by an action). Packets may contain packet headers and a payload, though the divide between the two depends on how deep into the packet an element is inspecting. For instance, for a network element that only looks at and operates on the layer 2 (e.g., Ethernet) headers, the layer 3 (e.g., IPv4, IPv6, etc.), layer 4 (e.g., TCP, UDP, etc.) portions are part of the packet payload. However, for a network element that uses the layer 4 headers, the layer 2, layer 3, and layer 4 portions are all part of the headers, and the remainder of the packet is treated as payload. Each header (e.g., the layer 2 header, layer 3 header, layer 4 header, tunnel encapsulations, etc.) may include one or more header fields, which contain data values. For example, the source and destination IP addresses of an IP header (e.g., IPv4 header) are two different header fields of the IP header, while the source port and destination port addresses of a TCP header are two different header fields of the TCP header.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While separating the different packet headers from the payload and separating the participating header fields from the nonparticipating header fields, the parser of some embodiments (1) populates the primary packet header vector (PPHV) 230 with only the participating header fields of different headers (i.e., the fields that may be processed by the MAU), and (2) populates the secondary packet header vector (SPHV) 240 with the nonparticipating fields of the different packet headers (i.e., the fields that will not be processed by the MAU).

Each of the PPHV and SPHV includes a set of registers that stores the packet header fields in some embodiments. For example, and as described above, the PPHV 230 of some embodiments includes a combination of different size registers (e.g., with a total capacity of 4 k bits) that hold the packet header field values that may be processed the MAU. Similarly, the SPHV 240 of some embodiments includes a set of the same or different size registers (e.g., shift registers, FIFO registers, etc.) for holding non-used header field values (e.g., with a total capacity of 2 k bits).

In some embodiments, the parser delivers the populated PPHV 230 to the MAU 150, which includes a set of match-action stages for matching the different header fields of the packet against the different match tables and applying the required actions to the packet by modifying the packet header data (e.g., assigning the packet to an output port and queue, sending the packet to a network controller, dropping the packet, modifying the header field values of the PPHV, etc.). The parser of some such embodiments also delivers the populated SPHV 240 directly to the deparser 155 along with the payload of the packet and without having the MAU 150 process the SPHV 240. By carrying the SPHV directly to the deparser without having the registers sent to the MAU, the wiring of the switch with respect to these packet header registers is greatly simplified.

In some embodiments, after the packet headers are processed by the MAU 150, the deparser 155 reassembles the packet with (1) the processed header data (that might or might not have been modified) which the deparser receives from the MAU 150, (2) the unprocessed header data stored in the SPHV 240 that the deparser receives from the parser 145, and (3) the payload 220 of the packet that the deparser also receives from the parser 145. As described before, after reassembling the packet, if the packet is reassembled by an ingress deparser, the deparser sends the packet to a queuing system to be subsequently forwarded to the egress pipeline of the switch. On the other hand, if the packet is reassembled by an egress deparser, the deparser sends the packet (with a header that might or might not have been modified) out of the switch. In some embodiments, the deparser recognizes the location in the reconstructed packet at which to place each value from the different registers (as an example, the 13 bits of the IPv4 fragment offset field that might be located in register X of the SPHV are inserted directly after the 3 bits of the flags field from register Y of the SPHV and directly before the 8 bits of the time to live field from register N of the PPHV).

Figure 3:
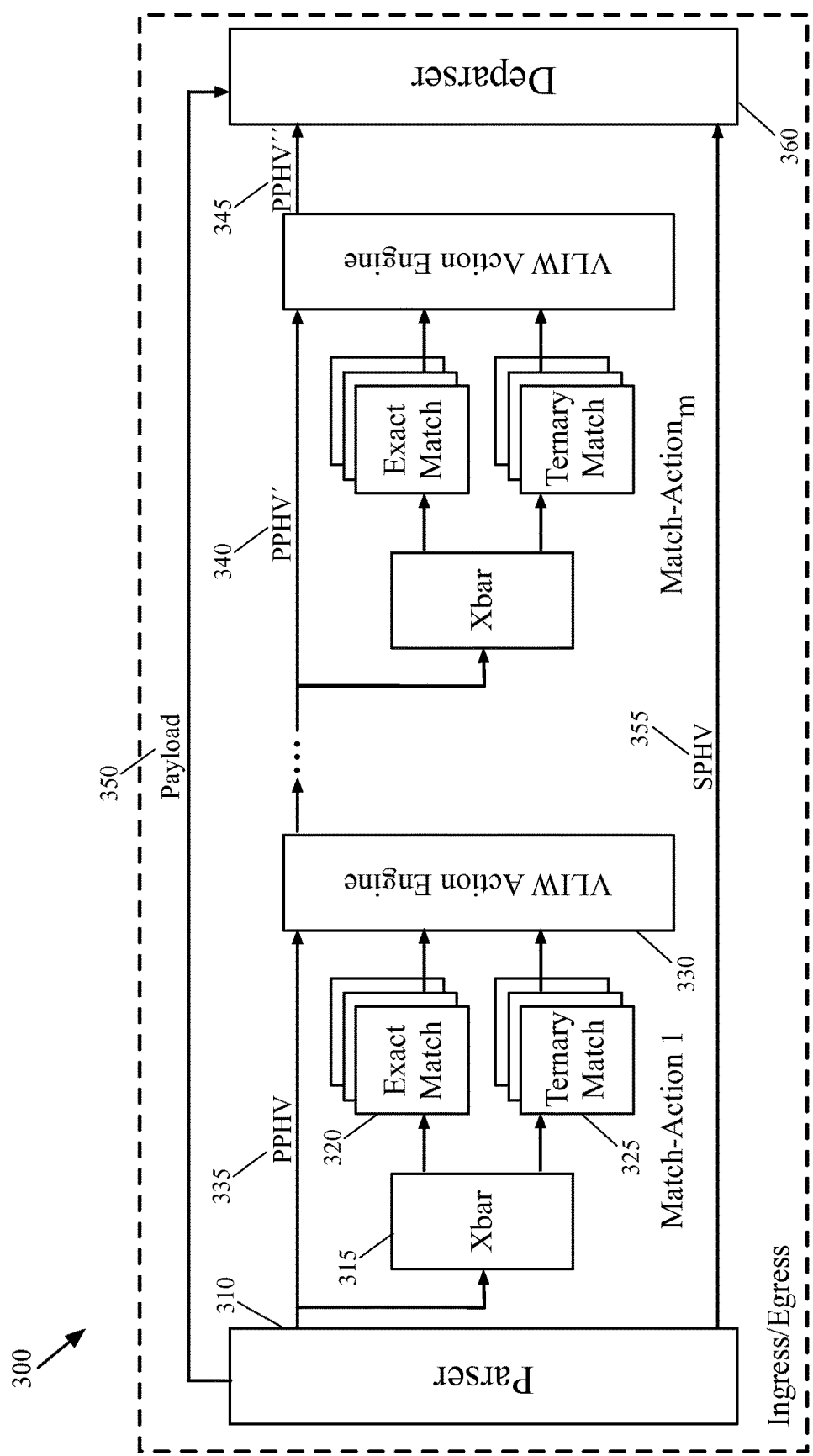
FIG. 3 illustrates an ingress/egress pipeline architecture that separates the participating header fields of the different packet headers from nonparticipating packet header fields of a packet.

FIG. 3 illustrates an ingress/egress pipeline architecture 300 that separates the participating header fields (i.e., the header fields that may participate in the different match-action stages of the MAU) of the different packet headers from non-participating packet header fields of a packet. More specifically, the figure shows that the pipeline 300 includes a parser 310, an MAU with multiple match-action stages 1 through m (where m is an integer such as 32 in some embodiment), and a deparser 360. As illustrated, each match-action stage includes a Xbar 315, a set of exact match tables 320, a set of ternary match tables 325, and a Very Long Instruction Word (VLIW) action engine 330.

As described above, the parser 310 receives a packet (e.g., through a set of input modules of the switch) and extracts the packet headers (e.g., Ethernet header, IPv4 header, IPv6 header, TCP header, UPD header, tunnel encapsulation headers, etc.) from the body of the packet. The parser 310 then separates the header field values that may be processed by the MAU from the rest of the header field values in each packet header. As stated above, the header fields of a packet header are the different segments of the packet header, each of which stores a particular value representing a particular piece of data. For example, an IPv4 packet header includes a source IP address header field, a destination IP address header field, an IPv4 identification field header field, a time-to-live header field, etc.

The parser of some embodiments determines which header fields are participating header fields (i.e., the fields that may be processed by the MAU) and which header fields are non-participating header fields based on configuration data that the parser receives from a configurator module in the control plane. In some such embodiments, the configurator module receives the configuration data from a compiler (also part of the control plane) which generates the configuration data based on a set of instructions that the compiler receives (e.g., from a user designing the functionality of the hardware switch). The compiler and configurator modules of some embodiments are described in more detail below by reference to FIG. 5.

While the parser 310 separates the header fields that may be processed by the MAU from the rest of the header fields of the different packet headers, the parser stores the participating header fields in the PPHV (in different registers of the PPHV) and delivers the PPHV to the MAU for further processing of the header data. As described above, the MAU of some embodiments includes a set of different stages, each of which is configured to process a particular set of header fields of the PPHV. In some embodiments, each of these stages is reconfigurable by a controller that is responsible for configuring (and reconfiguring) the stages of the match-action units of the hardware switch to match against various different packet header fields.

In some embodiments, the output PPHV from the parser 310 is delivered to both the Xbar 315 and the VLIW action engine 330. The Xbar 315 of each stage, in some embodiments, includes a set of one or more crossbars (e.g., two crossbars) that identifies which field or fields of the PPHV are used by the match tables of the corresponding stage of the MAU, and delivers the identified fields to the exact match tables and ternary match tables of the stage. For instance if the match tables of a particular stage are configured to match against a source IP address field that is carried by one or more PPHV registers, the Xbar 315 of that particular stage takes the IP source field from the PPHV register(s) and delivers the field to the match tables. In some embodiments, the Xbar 315 operates at a bit level. That is, a particular header field that contains 20 bits might be carried by a 16-bit register and a portion of an 8-bit register of the PPHV. The Xbar of some such embodiments, therefore, passes only 20 bits of the data that is carried by the combination of the 16-bit register and the 8-bit register to its corresponding match tables.

As illustrated in FIG. 3, each match-action stage of the MAU includes a set of ternary match tables 325 and a set of exact match table 320. Some embodiments implement (1) the ternary match tables with ternary content addressable memory (TCAM) units, and (2) the exact match tables with static random-access memory (SRAM) units, that operate as hash tables. Each one of the ternary match tables and exact match tables of some embodiments includes a number of entries (e.g., flow entries) each of which matches against the values of one or more packet header fields and instructs the action engine 330 of the same stage to take a particular action (e.g., an action stored in a SRAM unit of an action table).

In some embodiments the ternary match table stores packet header data that can include ternary bits (i.e., bits with values of 0, 1 or wildcard). Wildcarding the bits allow a single table entry to match a wide variety of packet header fields. The exact match table of some embodiments does not allow any wildcarding, hence the packets must exactly match the table entries. When the header field is matched against an entry of a match table (a ternary table or an exact match table), several pointers which together contain the required information to perform the desired actions are retrieved from that entry of the match table. The information, in some embodiments, includes, among other data, an instruction memory address for the action engine 320 and an action memory address and size. The desired actions include simple actions such as setting a field in the PPHV to a particular value or dropping a packet, as well as complex operations, such as adding encapsulations to the packet (e.g., Provider Backbone Bridges (PBB) encapsulation, GRE or GENEVE tunneling, etc.).

In some embodiments, the VLIW action engine 330 includes different action operations that may receive their sources from packet header fields (which is why a copy of the PPHV registers are directly delivered to the action unit), or from an action memory (not shown). An action indicated by a match may be simple and require only a small amount of data from the action memory or complex and require a large amount of data. When the action engine 330 receives the action data (from the action memory or the PPHV), the action engine takes the required action which may include modifying a header field in the PPHV (e.g., to decrement the TTL field of the IP header, change the address of the packet, etc., or taking another action such as assigning the packet to an output port and/or queue, sending the packet to the controller, dropping the packet, etc. After the required action is taken (e.g., when a match is found) in each stage of the MAU, the PPHV (as modified by the action, if such modifications are performed) is delivered to the next stage of the MAU for further processing. In some embodiments, each successive PPHV that includes the packet header data of one packet progresses through the pipeline of match-action stages one clock cycle behind the previous PPHV.

The last match-action stage of the MAU, after processing the PPHV, delivers the processed PPHV to the deparser 360. As described above, after receiving the PPHV of a particular packet from the MAU, the deparser 360 of some embodiments reassembles the packet by putting together the processed header fields that are received from the MAU, with the unprocessed header fields that are received directly from the parser 310 in the SPHV 355 and the payload 350 of the packet that is also received directly from the parser 310. The packet is then either sent out of the switch (if the deparser is an egress deparser), or sent to the queuing system (if the deparser is an ingress deparser) for further processing by the egress pipeline of the switch.

Figure 4:
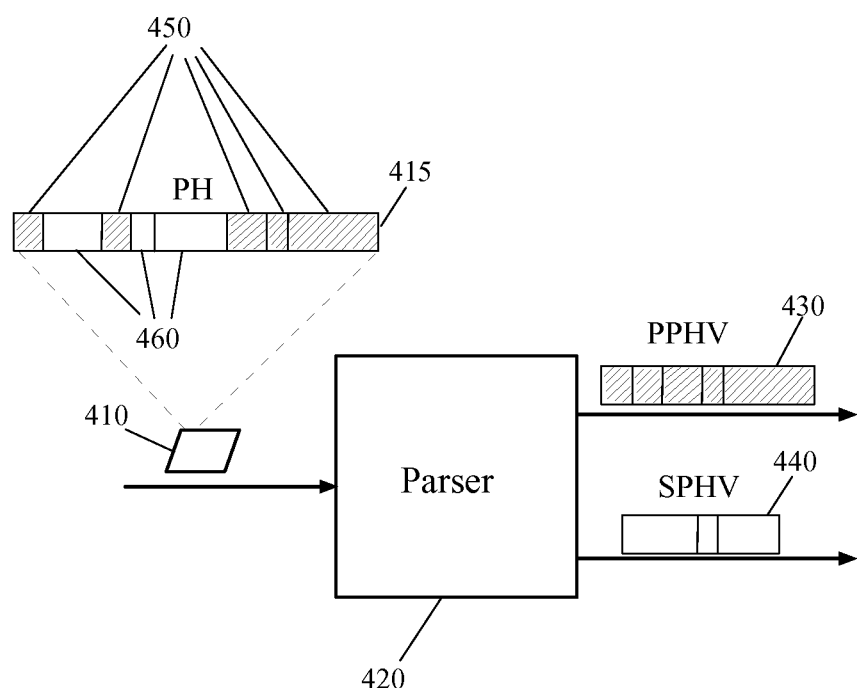
FIG. 4 conceptually illustrates the reason that the parser of some embodiments does not store the entire packet headers in the PPHV to be processed by the MAU.

FIG. 4 conceptually illustrates the reason that the parser of some embodiments does not store the entire packet headers in the PPHV to be processed by the MAU. This figure shows that a packet 410 is being received by the parser 420 to parse the packet headers into the PPHV 430. However, not every header field of each packet header is needed by the MAU stages of the upcoming ingress or egress pipeline to which the parser sends the PPHV. For instance, some of the packet header fields will (i) not be matched against by any of the match entries of the match tables in the pipeline and (ii) not be modified by any possible action entry that could be performed in the pipeline. Thus, as the parser 420 extracts each packet header from the packet 410, it determines which of the header fields of the packet header might be processed by at least one of the match-action stages of the MAU.

The illustrated example shows that a packet header 415 (e.g., an Ethernet header, IPv4 header, etc.) of the packet 410 includes several participating header fields 450 that the MAU is configured (e.g., by a configurator module of the control plane) to potentially process. At the same time, the packet header 415 also includes several other non-participating header fields 460 that the MAU is not configured to process. In some embodiments, when the parser 420 extracts a particular packet header from the packet 410, the parser must extract the entire contiguous packet header at once (i.e., the parser cannot leave certain fields of a packet header in the payload while placing the other fields of the packet header in the PHV). Because the different participating header fields of the packet header are often not placed next to each other in the packet header (as illustrated in the figure), the parser of some embodiments separates these participating header fields from nonparticipating fields during extraction of the packet header.

For example, the MAU might be configured to process only a particular set of header fields in a UDP packet header, which may not be the first two header fields of the packet header (i.e., the source and destination ports). In such a case, the parser locates the particular header fields in the set, pulls these fields out of the packet header, and stores the header fields in the PPHV. However, the other nonparticipating header fields that are also extracted from the packet have to be dealt with as well. Therefore, in some embodiments, the parser 420 looks at each header field in the packet header and determines whether the identified header field might be processed by the MAU or will definitely not be processed by the MAU. Though not the case in this example, in some embodiments none of the fields of a packet header might be placed in the PPHV, but the parser would extract these fields and place them in the SPHV in order to continue deeper into the packet and place the fields of a higher-layer packet into the PPHV.

If the parser 420 determines that the header field is one of the participating header fields, the parser stores the header field in the PPHV 430 (i.e., in a particular set of registers of the PPHV 430 designated for that header field). On the other hand, if the parser 420 determines that the identified header field is not supposed to be processed by the MAU, the parser stores the header field in the SPHV 440 to be subsequently sent directly to the deparser (not shown) of the pipeline without getting processed.

The parser of some embodiments determines which fields of each packet header may be processed and which fields will not be processed by the MAU, based on the information the parser receives from the packet itself (e.g., by one or more particular packet header of the packet), and based on the configuration data received from a compiler in the control plane. In some embodiments, the compiler receives the data required for configuring the pipeline (e.g., through a programming language code), generates a set of configuration data, and distributes the generated data to a configurator module (also in the control plane). The configurator module then distributes the configuration data to both parser and MAU of the pipeline in the switch (e.g., at run-time or during setup time).

Figure 5:
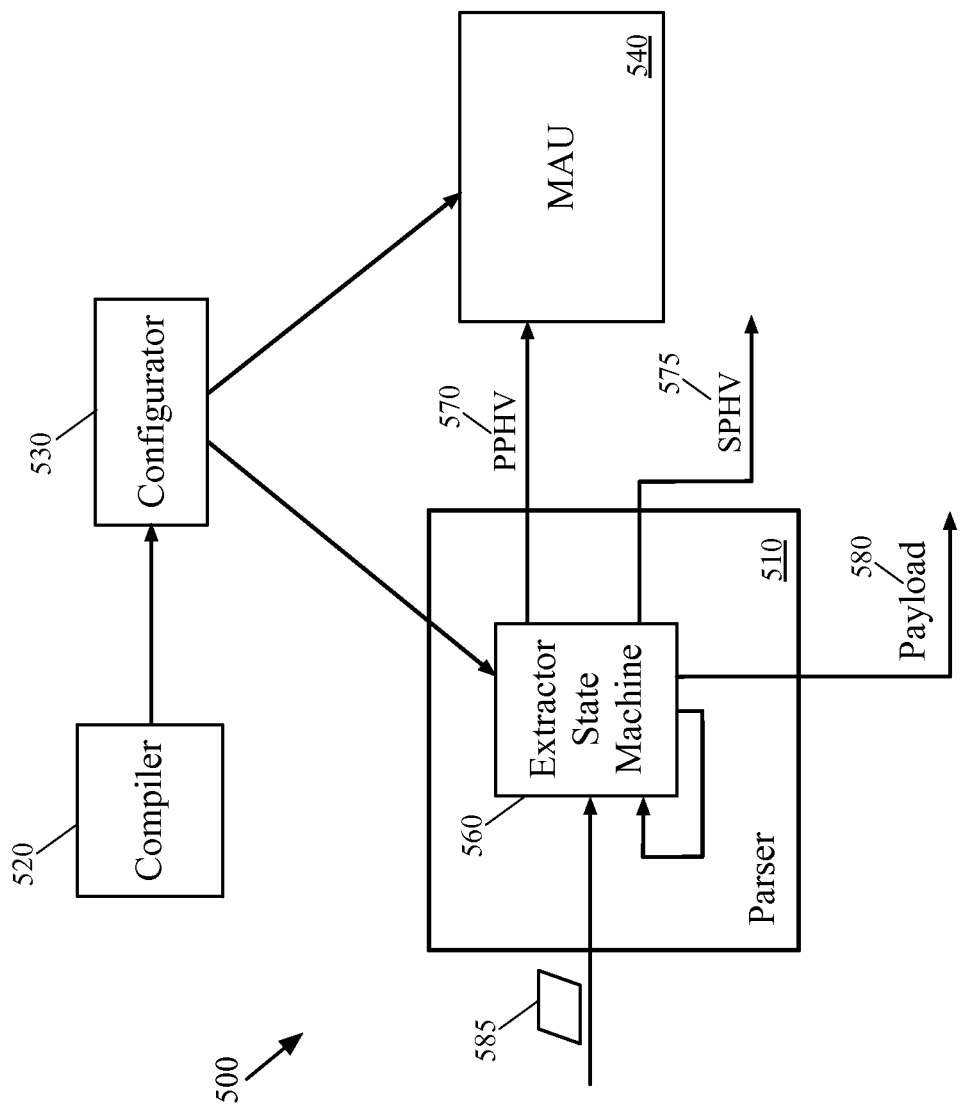
FIG. 5 conceptually illustrates a block diagram of a parser that is configured by a compiler to separate the participating (in an MAU process) packet header fields from nonparticipating header fields.

FIG. 5 conceptually illustrates a block diagram 500 of a parser that is configured by a compiler to separate the participating packet header fields from non-participating header fields. Specifically, this figure shows a parser 510, a compiler 520, a configurator 530, and an MAU 540. The parser 510 of some embodiments includes an extractor state machine 560. In some embodiments, the compiler 520 and configurator 530 are separate from the hardware switch (i.e., not part of the chip), whereas the parser 510 and MAU 540 are part of the hardware switch circuitry. The configurator 530, in some embodiments, represents a runtime network controller stack that configures the hardware switch, while the compiler 520 operates at an earlier stage to generate the configuration data and provide this configuration data to the configurator 530.

In some embodiments, the compiler 520 generates configuration data for the hardware switch based on a switch configuration received by the compiler 520 (e.g., through code written by a user, such as P4 code for designing switch operations). The configuration data specifies how to program the match-action stages of the MAU 540 to implement the switch configuration specified by the received configuration code, as well as how to program the extractor state machine 560 of the parser to extract the packet header fields correctly and to place the packet header fields into the appropriate PPHV or SPHV registers.

The compiler 520 passes the configuration data to the configurator 530, which provides the configuration data to the MAU 540 so that the MAU can implement the appropriate switch configuration. In addition, the configurator 530 provides the parser configuration data generated by the compiler 520 to the extractor state machine 560 so that the extractor state machine can extract header fields from the packets into the registers of the PPHV and the SPHV.

The extractor state machine 560 receives the packet 585 and (i) separates the packet headers into the PPHV 570 and the SPHV 575 and (ii) separates out the payload 580 of the packet. In some embodiments, the extractor state machine begins at the front of the packet (i.e., the outermost headers) and works inward, extracting each packet header field into either the PPHV or the SPHV. For certain header fields, the extractor state machine looks at the value and compares the value to configuration entries (e.g., TCAM entries), which specify how the next set of packet header fields should be extracted.

The extractor state machine 560 follows a parse graph that specifies numerous states at which a particular packet header field is extracted into either the PPHV or the SPHV, as well as what state of the parse graph to proceed to next. That is, in some embodiments each state specifies which bits of the header to extract for a particular header field, which register (s) of the PPHV or SPHV to put those bits into, and to which state to proceed next. The extractor state machine 560 of some embodiments may also read the data of certain header fields in order to determine which path to take through the set of states of the parse graph. For example, the EtherType field of an Ethernet header indicates the type of protocol encapsulated by the Ethernet header (e.g., IPv4, IPv6, ARP, etc.). The different fields of these protocols will be formatted differently, so for the extractor state machine 560 to properly identify the next state(s) in the parse graph, it needs to know the EtherType value. Similarly, the protocol field of an IPv4 header specifies the transport layer protocol (e.g., TCP, UDP, etc.), which will determine how those fields are extracted.

In some embodiments, the parse graph is implemented in the parser 530 as a set of entries in TCAMs that the extractor state machine matches. The packet header is received as a set of bits stored in, e.g., a buffer, and at any time during the extraction process a pointer points to a particular location in the buffer. The TCAM entries of the parse graph of some embodiments specify which type of header is next based on the value of certain fields of a current header (e.g., the EtherType field of an Ethernet header, the protocol field of an IPv4 header, etc.), and how to extract the header fields of the next header. This entails specifying how many bits to extract for each header field in the next header, to where in the sets of registers of the PPHV and the SPHV each header field should be extracted, and to where in the buffer to move the pointer for the next header field. As mentioned, for certain fields, the header field value is matched against the TCAM entries to determine the next state or set of states based on the determination as to what type of packet headers are contained in the packet.

The parser configuration specifies which packet headers will be extracted into the PPHV and which packet headers are extracted into the SPHV. In some embodiments, any field that is either (i) used as a match field of any match entry in the MAU and/or (ii) modified by any action entry in the MAU is extracted into the PPHV, with only the header fields that are not involved in any way with the MAU extracted into the SPHV. Thus, for some packets, some of the header fields in the PPHV will not actually be used or modified by the MAU (especially if one of the earlier stages instructs the switch to drop the packet). Identifying all of the fields that will be used on a packet-by-packet basis would effectively entail performing the match-action pipeline (because the values of the header fields would have to be considered for each stage to determine which actions to take, and the actions performed to find the new values for the header fields in order to identify which fields are considered at subsequent stages). Thus, the extractor state machine 560 of some embodiments only reads and matches against the values for certain header fields that identify the structure of the subsequent packet headers, so that the subsequent packet headers can be extracted properly according to the parse graph.

Separating the fields that may be processed by the MAU from the rest of the fields in each packet header improves the overall efficiency of the switch in many ways. For instance, this separation helps avoid wasting the valuable resources of the MAU by enabling these resources to only (or primarily) process data that is actually needed for making the packet processing determinations. For example, a TCP packet header typically has a minimum length of five words (twenty bytes). In many cases, the MAU of the pipeline processes only four bytes of the TCP header bytes (i.e., the source and destination port addresses) and the rest of the fields in the TCP header (sixteen bytes) are not used by any of the stages of the MAU. In such cases, by separating the unused data from useful data, the parser does not waste any of the valuable resources of the MAU to process the other sixteen bytes of the TCP header.

In addition, separating the PPHV form the SPHV enables the parser to parse deeper into packets while sending the same amount of data to the MAU (via the PPHV). While using a single PPHV of a fixed size only allows the parser to extract the packet headers up to a certain point (the size of the PPHV), sending some of the unused fields into the SPHV allows the PPHV to carry only the more useful fields, and include deeper packet headers. For example, newer tunneling protocols such as GENEVE add variable length option fields to the packet header, and may be quite long. Similarly, packets sent using multi-layer tunneling may have significant amounts of packet header data that may need to be extracted in order to reach the layer 4 (e.g., TCP) data. By sending the fields that will not be processed by the MAU to the SPHV, the PPHV can include packet header fields that are located deeper into the packet, without sending additional data to the MAU.

Figure 6:
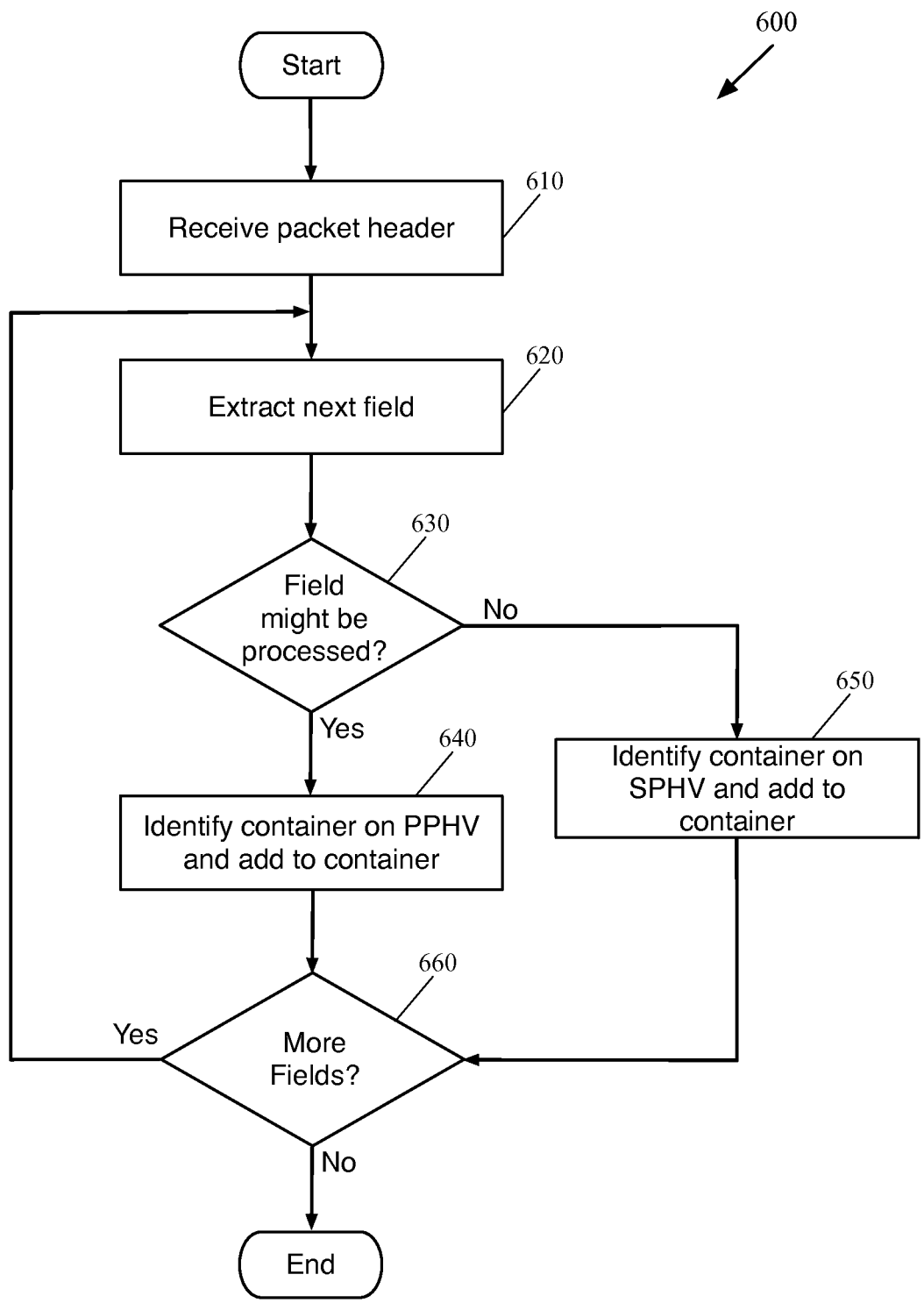
FIG. 6 conceptually illustrates a process of some embodiments that populates the PPHV and SPHV with different header fields of a packet header.

FIG. 6 conceptually illustrates a process 600 of some embodiments that populates the PPHV and SPHV with different header field values (e.g., source and destination port addresses, fragmentation offset field, transport layer ports, encapsulation addresses, etc.) of a packet header (e.g., IPv4, TCP, UDP, etc.). The process 600 of some embodiments is performed by an extractor state machine of a ingress parser or egress parser of a hardware switch in some embodiments, such as the extractor state machine 560 illustrated in FIG. 5.

The process 600 initiates by receiving (at 610) a packet header. In some embodiments the process receives the packet header from a packet receiver module of the parser, such as the packet receiver 550 of FIG. 5. A packet header could be an Ethernet header, an IP header, a TCP header, etc. In addition, in some embodiments, the process has learned (e.g., from examining a previous packet header field), the format of the received packet header (i.e., what type of packet header it is, and therefore the lengths of the different fields of the packet header.

The process then extracts (at 620) the next header field of the received packet header. As described above, in some embodiments the extractor state machine points to a particular location in a buffer that holds the packet header, and the parser configuration (implementing the parse graph) identifies the length of the next packet header, starting from that particular location. Thus, to extract the next header field, the process extracts the specified next number of bits (and, in some embodiments, moves the pointer to the new location after the last extracted bit).

The process then determines (at 630) whether the extracted field may be processed by any of the match-action stages of the MAU. When the process determines that the extracted field is a participating header field that could be used at some point during the processing of the PPHV through the different stages of the MAU, the process identifies (at 640) a container (e.g., one or more registers of the PPHV) in the PPHV and stores the extracted header field in the identified container of the PPHV. On the other hand, if the process determines that the extracted field is a nonparticipating header field, which will not processed by any match-action stage of the MAU, the process identifies (at 650) a container (e.g., one or more registers of the SPHV) in the SPHV and stores the extracted header field in the identified container of the SPHV.

As described above, in some embodiments operations 620-640 or 620-650 are all performed as a single operation. Specifically, the determination as to whether a particular field may be processed by the MAU is made during the generation of the parse graph, (according to the configuration data) and embedded in the parse graph based on whether the parse graph instructions specify to store the particular header field in the PPHV or the SPHV. Thus, the extractor state machine of some embodiments extracts the header field (i.e., the next X bits of the packet header) into a specific register of either the PPHV or the SPHV, without performing any specific analysis at packet processing time as to whether the header field is a participating or non-participating header field.

After storing the extracted header field in one of the PPHV or the SPHV, the process of some embodiments determines (at 660) whether any additional header fields remain to be extracted. In some embodiments, the parse graph proceeds to the next state according to the instructions of the previous state, and each subsequent state identifies the next set of bits (i.e., the next header field) to extract. Upon reaching the last field to extract, the parse graph state specifies that the extraction process is done, at which point the process ends. Thus, when the parse graph state moves the pointer and specifies the next set of bits to extract, the process 600 returns to 620.

One of ordinary skill in the art will recognize that the specific operations of the process 600 may not be performed in the exact order shown and described above. Additionally, the specific operations may not be performed in one continuous series of operations, and different specific operations may be performed in different embodiments. For instance, as mentioned above, in some embodiments the process actually extracts the field directly into one of the containers of the PPHV or the SPHV, with the determination at 630 being conceptual. In other embodiments, the process 600 identifies the packet headers first and then performs the extraction of the header fields in the identified packet headers. More specifically, in some such embodiments, the process first extracts the first packet header (e.g., based on the configuration data and the parse graph) and after identifying the packet header, extracts the different header fields of the packet header and stores them either in the PPHV or the SPHV. Furthermore, the process could be implemented using several sub-processes, or as part of a larger macro process.

As mentioned, the compiler of some embodiments generates the configuration data for the different switch elements including both the MAU and the parser. The MAU configuration data specifies entries for match and action tables (implemented in TCAMs, or a combination of TCAMs and RAM) of the packet processing pipelines that enable the switch to modify, forward, etc. packets that it receives. The parser configuration data specifies how the parser processes different types of packets, to extract header fields correctly, and to place the extracted header fields into the appropriate containers of the PPHV and SPHV.

Figure 7:
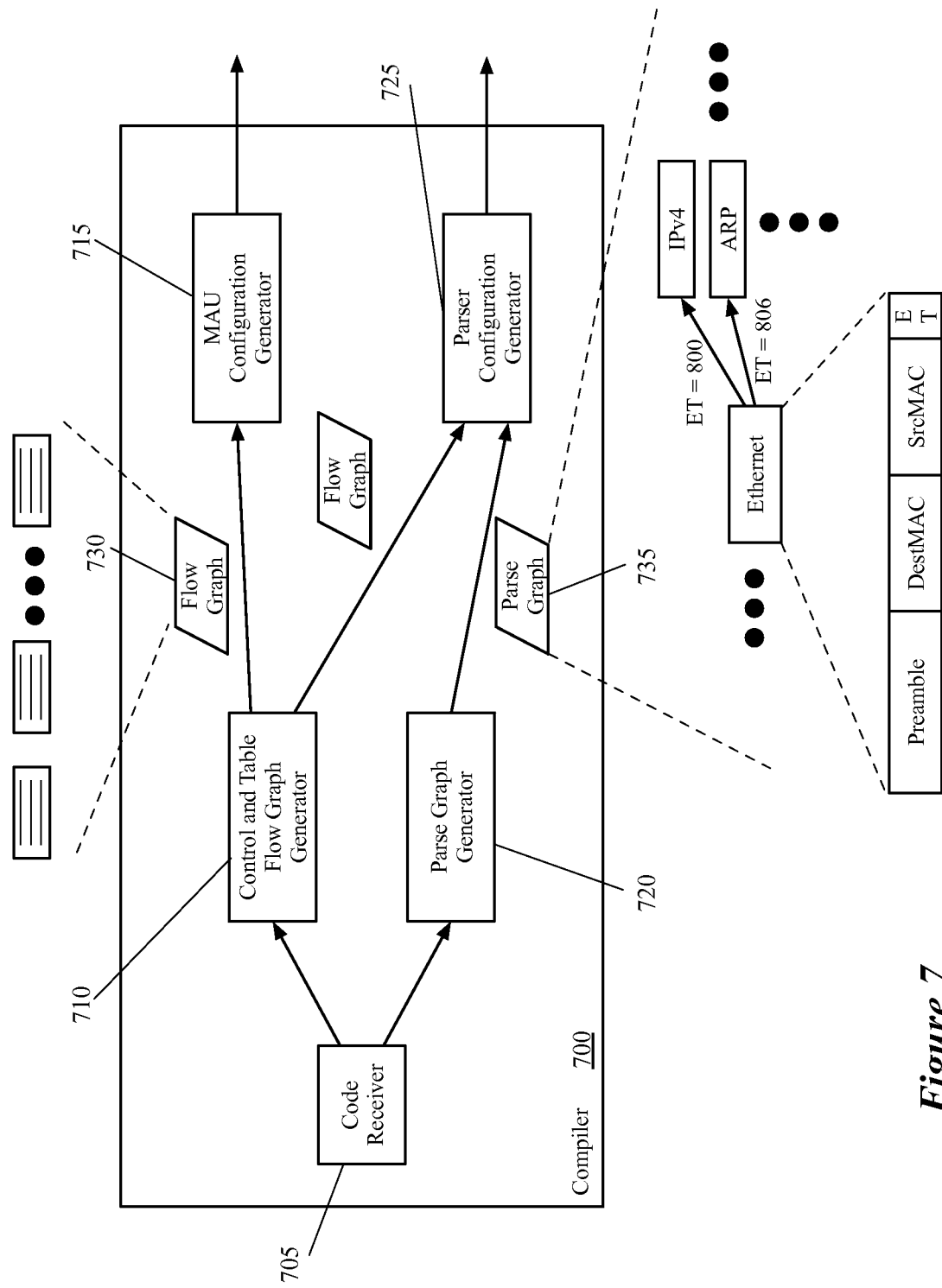
FIG. 7 conceptually illustrates a compiler of some embodiments for generating parser and MAU configuration data.

FIG. 7 conceptually illustrates a compiler 700 of some embodiments for generating parser and MAU configuration data. As shown, the compiler includes a code receiver 705, control and table flow graph generator 710, MAU configuration generator 715, parse graph generator 720, and parser configuration generator 725. The code receiver 705 receives code defining the switch operations (e.g., as written by a switch designer, network administrator, etc.), and passes this code to the graph generators 710 and 720 (possibly after translating the code into a different format if needed). In some embodiments, the code is received as P4 code.

The control and table flow graph generator 710 uses the received code to generate the possible flows through a set of match and action tables that the switch will implement. In some embodiments, the flow graph(s) may be linear or branched, depending on the nature of the code received by the compiler. As shown in the figure, the flow graph generator 710 outputs a flow graph 730, that includes numerous match-action stages. Each match-action stage includes a set of match entries that specify one or more packet header fields (or other data that is not actually part of the packet header, such as ingress or egress ports) over which packets will be matched, as well as corresponding action entries that specify actions to take when a packet matches the associated match entry. These actions may include modifying certain packet header fields, in addition to other actions (e.g., dropping the packet, modifying non-header field data about the packet). The MAU configuration generator 715 uses the control and table flow graphs to generate the MAU configuration entries, in some embodiments.

The parse graph generator 720 of some embodiments uses the received code to generate a parse graph specifying the possible paths that a parser can take to parse a received packet. Though shown here as generated from the code, in some embodiments the parse graph is information stored with the compiler, which specifies how to parse any packet. In other embodiments, some of the information (how any packet might be parsed) is stored with the compiler, but a parse graph for the particular switch is generated based on information in the code that indicates what types of packet may actually be processed by the switch (e.g., if all packets will only have Ethernet as the layer 2 protocol).

As shown, the parse graph generator 720 outputs a parse graph 735. The parse graph, initially, conceptually describes the different types of packet headers that could be received by the switch, and the order in which those packet headers are arranged. The figure also shows a portion of this parse graph, including the Ethernet header. As shown, the parse graph 735 specifies (i) how to parse the current header into fields and (ii) how to proceed from the current header to the next header, depending on the value of one or more of the fields of the current header. For the Ethernet header, the first eight bytes are the preamble (and start frame delimiter), the next twelve bytes are the destination MAC address and the source MAC address, and the last two bytes are the EtherType field. In addition, the edges of the parse graph exiting the Ethernet header node are dependent on the value of the EtherType field. For instance, if the EtherType field value is 800, then the next header is IPv4 (with the IPv4 node of the parse graph specifying how to parse the IPv4 header); if the EtherType field value is 806, then the next header is ARP, etc. The parse graph 735 continues in this manner until reaching a point at which additional data will not be parsed, and this additional data is treated as the payload. In some embodiments, the parse graph (prior to being converted into parser configuration data) continues through the entire packet.

The parser configuration generator 725 uses the parse graph 735 as well as the control and table flow graphs 730 to generate configuration data used to configure the parser in the hardware switch pipeline. The parser configuration data, in some embodiments, includes TCAM entries for each edge of the parse graph that is relevant to the switch (i.e., for each packet header that the switch might need to process). Each of these entries matches over the packet header field values in the current packet header that specify the type of the next packet header (e.g., the EtherType field, the protocol field of an IP packet, etc.). In some embodiments, the TCAM entries point to actions (e.g., in RAM) that specify how to parse the subsequent header (e.g., how to parse the various different fields of an IPv4 packet, an ARP packet, etc.).

In addition, the parser configuration generator 725 determines which fields of each packet header might actually be used in the match-action unit based on the flow graphs 730. In some embodiments, any packet header field that appears in at least one match entry or is modified by at least one action entry is marked for possible use. While the switch will probably not use the field for every packet containing such a header field, it might for at least some such packets (and for certain fields, the switch may use the field for almost every packet that contains the field). Some embodiments annotate the parse graph to identify the participating and non-participating header fields. This information is then included in the configuration data for the parser, which specifies to send the participating header fields to particular registers of the PPHV and the non-participating header fields to particular registers of the SPHV. In some embodiments, the configuration data also specifies when to stop parsing the packet headers and treat the remainder of the packet as payload. This decision may be made based on the amount of data already stored in the PHVs for the current traversal through the nodes of the parse graph, or because the end of relevant packet headers for the switch have been reached (e.g., the end of the innermost layer 4 headers).

Figure 8:
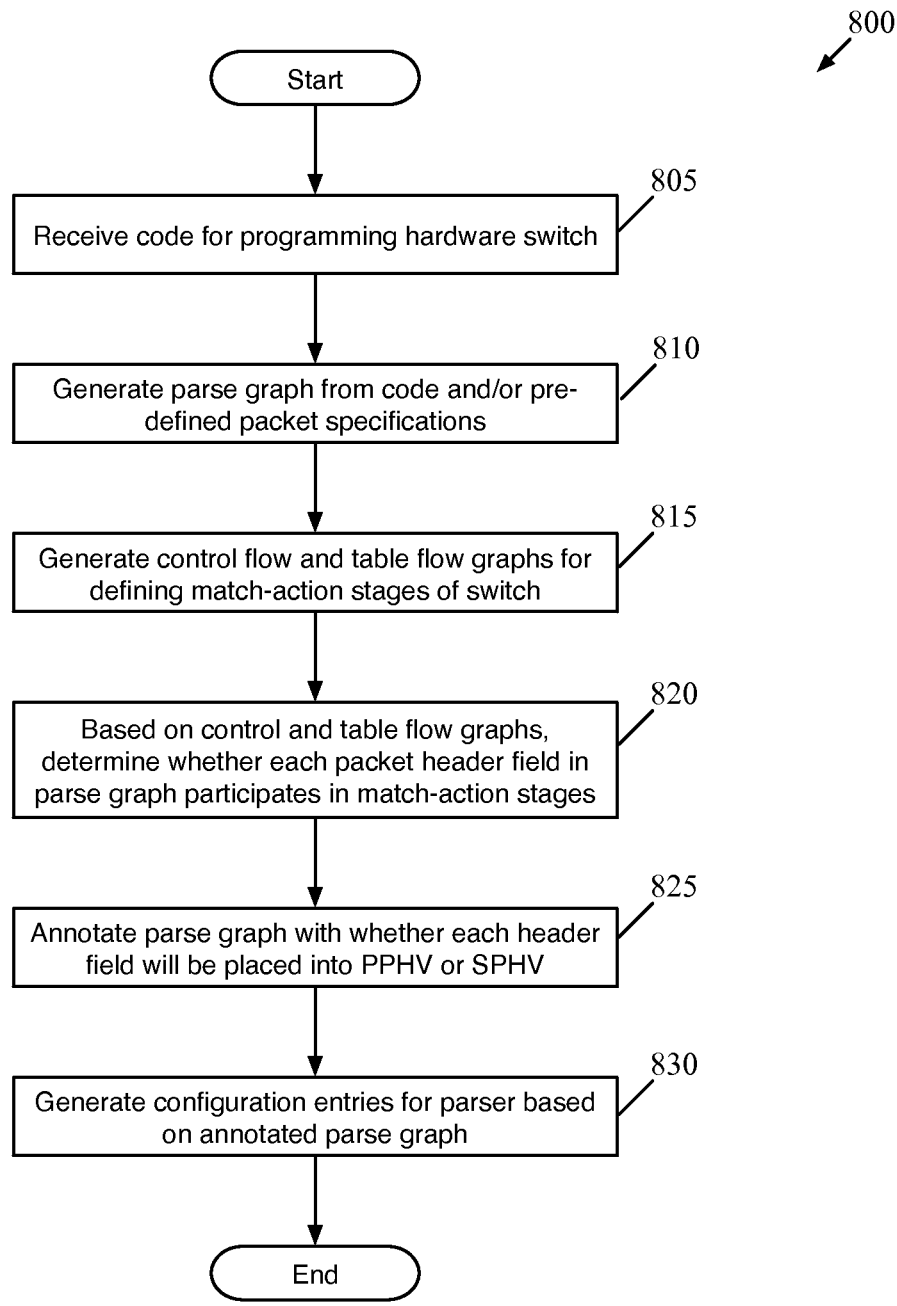
FIG. 8 conceptually illustrates a process performed by the compiler of some embodiments to generate parser configuration data for a hardware switch that parses packet header data into a PPHV and a SPHV.

FIG. 8 conceptually illustrates a process 800 performed by the compiler of some embodiments to generate parser configuration data for a hardware switch that parses packet header data into a PPHV and a SPHV. As shown, the process 800 begins by receiving (at 805) code for programming the hardware switch. In some embodiments, the code is received as P4 code, describing how the switch should function.

The process then generates (at 810) a parse graph from the code and/or pre-defined packet specifications. In some embodiments the parse graph is information stored with the compiler, which specifies how to parse any packet. In other embodiments, some of the information (how any packet might be parsed) is stored with the compiler, but a parse graph for the particular switch is generated based on information in the code that indicates what types of packets may actually be processed by the switch (e.g., if all packets will only have Ethernet as the layer 2 protocol).

The parse graph of some embodiments conceptually describes the different types of packet headers that could be received by the switch, and the order in which those packet headers are arranged. Each node in the parse graph represents a packet header, and the parse graph specifies (i) how to parse the header into packet header fields and (ii) how to proceed from the current header to the next header, depending on the value of one or more of the fields of the current header. For the Ethernet header, for example, the first eight bytes are the preamble (and start frame delimiter), the next twelve bytes are the destination MAC address and the source MAC address, and the last two bytes are the EtherType field. The edges of the parse graph exiting each node are dependent on the value of one or more of the field values of the current field.

The process 800 also generates (at 815) control flow and table flow graphs for defining the match-action stages of the switch. In some embodiments, the flow graph(s) may be linear or branched, depending on the nature of the code received by the compiler. Each match-action stage in the table flow graph includes a set of match entries that specify one or more packet header fields (or other data that is not actually part of the packet header, such as ingress or egress ports) over which packets will be matched, as well as corresponding action entries that specify actions to take when a packet matches the associated match entry. These actions may include modifying certain packet header fields, in addition to other actions (e.g., dropping the packet, modifying non-header field data about the packet).

Based on the control and table flow graphs, the process 800 determines (at 820) whether each packet header field specified in the parse graph participates in the match-action stages. The process annotates (at 825) the parse graph with whether each header field will be placed into the PPHV or the SPHV. In some embodiments, any packet header field that appears in at least one match entry or is modified by at least one action entry is marked for possible use. While the switch will probably not use the field for every packet containing such a header field, it might for at least some such packets (and for certain fields, the switch may use the field for almost every packet that contains the field). Participating packet header fields are marked to be sent to the PPHV, while non-participating packet header fields are marked to be sent to the SPHV.

Finally, the process 800 generates (at 830) configuration entries for the parser based on the annotated parse graph. The parser configuration data, in some embodiments, includes TCAM entries for each edge of the parse graph that is relevant to the switch (i.e., for each packet header that the switch might need to process). Each of these entries matches over the packet header field values in the current packet header that specify the type of the next packet header (e.g., the EtherType field, the protocol field of an IP packet, etc.). In some embodiments, the TCAM entries point to actions (e.g., in RAM) that specify how to parse the subsequent header (e.g., how to parse the various different fields of an IPv4 packet, an ARP packet, etc.).

The configuration data for the parser also specifies to send the participating header fields to particular registers of the PPHV and the non-participating header fields to particular registers of the SPHV. In some embodiments, the configuration data also specifies when to stop parsing the packet headers and treat the remainder of the packet as payload. This decision may be made based on the amount of data already stored in the PHVs for the current traversal through the nodes of the parse graph, or because the end of relevant packet headers for the switch have been reached (e.g., the end of the innermost layer 4 headers).

Some of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 9:
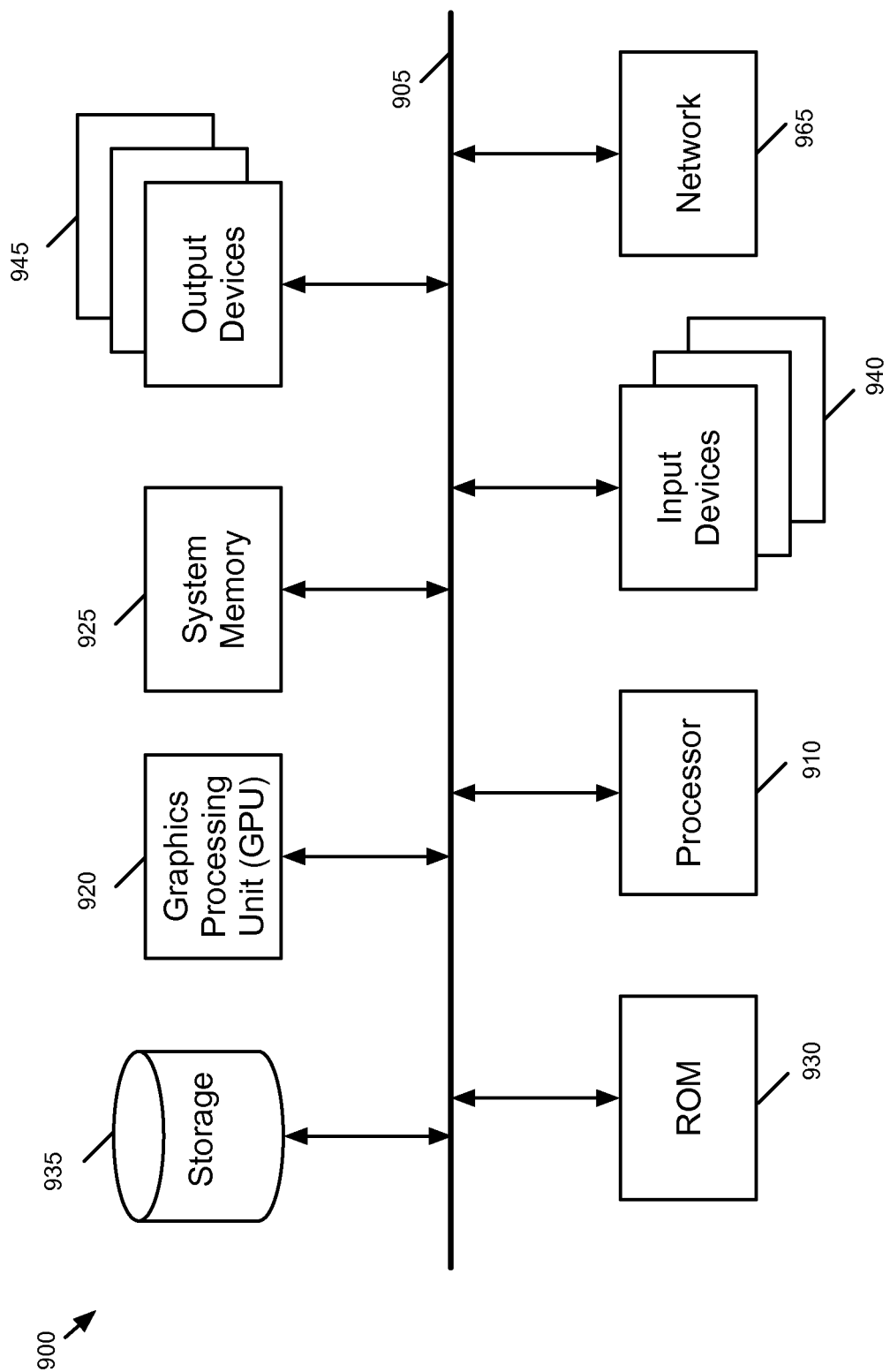
FIG. 9 conceptually illustrates an electronic system with which some embodiments of the invention are implemented.

FIG. 9 conceptually illustrates an electronic system 900 with which some embodiments of the invention are implemented. The electronic system 900 can be used to execute any of the control, virtualization, or operating system applications described above. The electronic system 900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 900 includes a bus 905, processing unit(s) 910, a system memory 925, a read-only memory 930, a permanent storage device 935, input devices 940, and output devices 945.

The bus 905 collectively represents all system, peripheral, and chipset buses that communicatively connect the numerous internal devices of the electronic system 900. For instance, the bus 905 communicatively connects the processing unit(s) 910 with the read-only memory 930, the system memory 925, and the permanent storage device 935.

From these various memory units, the processing unit(s) 910 retrieves instructions to execute and data to process in order to execute the processes of the invention. The processing unit(s) may be a single processor or a multi-core processor in different embodiments.

The read-only-memory (ROM) 930 stores static data and instructions that are needed by the processing unit(s) 910 and other modules of the electronic system. The permanent storage device 935, on the other hand, is a read-and-write memory device. This device is a non-volatile memory unit that stores instructions and data even when the electronic system 900 is off. Some embodiments of the invention use a mass-storage device (such as a magnetic or optical disk and its corresponding disk drive) as the permanent storage device 935.

Other embodiments use a removable storage device (such as a floppy disk, flash drive, etc.) as the permanent storage device. Like the permanent storage device 935, the system memory 925 is a read-and-write memory device. However, unlike storage device 935, the system memory is a volatile read-and-write memory, such a random access memory. The system memory stores some of the instructions and data that the processor needs at runtime. In some embodiments, the invention's processes are stored in the system memory 925, the permanent storage device 935, and/or the read-only memory 930. From these various memory units, the processing unit(s) 910 retrieves instructions to execute and data to process in order to execute the processes of some embodiments.

The bus 905 also connects to the input and output devices 940 and 945. The input devices enable the user to communicate information and select commands to the electronic system. The input devices 940 include alphanumeric keyboards and pointing devices (also called "cursor control devices"). The output devices 945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 9, bus 905 also couples electronic system 900 to a network 965 through a network adapter (not shown). In this manner, the computer can be a part of a network of computers (such as a local area network ("LAN"), a wide area network ("WAN"), or an Intranet, or a network of networks, such as the Internet. Any or all components of electronic system 900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 6 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. Integrated circuit for use in packet switching-related operations in a network, the integrated circuit being configurable to be used in a hardware switch in association with ternary content addressable memory (TCAM), the packet switching-related operations being programmable based upon configuration data to be received by the integrated circuit, the integrated circuit comprising:
   an ingress pipeline to process packet data received by the integrated circuit;
   a shared queuing system to queue the packet data processed by the ingress pipeline; and
   an egress pipeline to obtain, from the shared queuing system, the packet data processed by the ingress pipeline, and also to further process the packet data processed by the ingress pipeline;
   wherein:
      the ingress pipeline comprises a configurable parser and configurable match-action stages;
      the egress pipeline comprises at least one other stage;
      the configurable parser is to be configured, in accordance with the configuration data, to parse packet header fields to generate multiple sets of header field data;
      the multiple sets of header field data comprise (1) at least one set of header field data for use by at least one of the match-action stages and (2) at least one other set of header field data;
      the at least one of the match-action stages is to perform actions associated with at least certain portions of the at least one set of header field data;
      the at least one of the match-action stages is to determine the actions based upon matching, at least in part, of the at least one set of header field data with match table data;
      the match action table data is configurable to comprise both (1) ternary content addressable table data to be stored in the TCAM and (2) exact match table data;
      the actions and the match action table data are to be configured based upon the configuration data;
      the actions are configurable to comprise packet header data modification and/or packet data port assignment;
      the at least one other stage is to generate output packet data for output from the integrated circuit;
      the at least one other stage is to generate the output packet data based upon modified packet header data generated by the at least one of the match-action stages;
      the at least one other set of header field data is unavailable for match-action stage modification; and
      the parser is configurable, based upon the configuration data, to store the at least one set of header field data, at least in part, in containers of different sizes.

2. The integrated circuit of claim 1, wherein:
   the parser is to extract the at least one set of header field data and the at least one other set of header field data in accordance with parse graph data that defines manner of header field extraction in terms of current bit field and next bit field for extraction; and
   the parse graph data is to be defined by the configuration data.

3. The integrated circuit of claim 2, wherein:
   the configuration data is to be generated by a compiler based upon user-written code; and
   the compiler is not part of the integrated circuit.

4. The integrated circuit of claim 3, wherein:
   the actions are also configurable to comprise:
      address modification; and
      packet data drop; and
   the packet switching-related operations are configurable to comprise:
      multi-layer tunneling protocol processing;
      GENEVE/GRE protocol processing; and
      variable field processing.

5. The integrated circuit of claim 4, wherein:
   the configuration data is configurable to instruct the parser to determine when header end has been reached, and to stop parse graph traversal and header parsing.

6. At least one non-transitory machine-readable storage medium storing instructions for being executed by an integrated circuit, the integrated circuit being for use in packet switching-related operations in a network, the integrated circuit being configurable to be used in a hardware switch in association with ternary content addressable memory (TCAM), the packet switching-related operations being programmable based upon configuration data to be received by the integrated circuit, the instructions when executed by the integrated circuit resulting in the integrated circuit being configured to perform operations comprising:
   processing, by an ingress pipeline of the integrated circuit, packet data received by the integrated circuit;
   queuing, by a shared queuing system of the integrated circuit, the packet data processed by the ingress pipeline; and
   obtaining, by an egress pipeline of the integrated circuit, from the shared queuing system, the packet data processed by the ingress pipeline; and
   further processing, by the egress pipeline, the packet data processed by the ingress pipeline;
   wherein:
      the ingress pipeline comprises a configurable parser and configurable match-action stages;
      the egress pipeline comprises at least one other stage;
      the configurable parser is to be configured, in accordance with the configuration data, to parse packet header fields to generate multiple sets of header field data;
      the multiple sets of header field data comprise (1) at least one set of header field data for use by at least one of the match-action stages and (2) at least one other set of header field data;
      the at least one of the match-action stages is to perform actions associated with at least certain portions of the at least one set of header field data;
      the at least one of the match-action stages is to determine the actions based upon matching, at least in part, of the at least one set of header field data with match table data;

the match action table data is configurable to comprise both (1) ternary content addressable table data to be stored in the TCAM and (2) exact match table data;

the actions and the match action table data are to be configured based upon the configuration data;

the actions are configurable to comprise packet header data modification and/or packet data port assignment;

the at least one other stage is to generate output packet data for output from the integrated circuit;

the at least one other stage is to generate the output packet data based upon modified packet header data generated by the at least one of the match-action stages;

the at least one other set of header field data is unavailable for match-action stage modification; and the parser is configurable, based upon the configuration data, to store the at least one set of header field data, at least in part, in containers of different sizes.

7. The at least one non-transitory machine-readable storage medium of claim 6, wherein:

the parser is to extract the at least one set of header field data and the at least one other set of header field data in accordance with parse graph data that defines manner of header field extraction in terms of current bit field and next bit field for extraction; and the parse graph data is to be defined by the configuration data.

8. The at least one non-transitory machine-readable storage medium of claim 7, wherein:

the configuration data is to be generated by a compiler based upon user-written code; and the compiler is not part of the integrated circuit.

9. The at least one non-transitory machine-readable storage medium of claim 8, wherein:

the actions are also configurable to comprise:
  address modification; and
  packet data drop; and
the packet switching-related operations are configurable to comprise:
  multi-layer tunneling protocol processing;
  GENEVE/GRE protocol processing; and
  variable field processing.

10. The at least one non-transitory machine-readable storage medium of claim 9, wherein:

the configuration data is configurable to instruct the parser to determine when header end has been reached, and to stop parse graph traversal and header parsing.

11. A method implemented using an integrated circuit, the integrated circuit being for use in packet switching-related operations in a network, the integrated circuit being configurable to be used in a hardware switch in association with ternary content addressable memory (TCAM), the packet switching-related operations being programmable based upon configuration data to be received by the integrated circuit, the method comprising:

processing, by an ingress pipeline of the integrated circuit, packet data received by the integrated circuit;

queuing, by a shared queuing system of the integrated circuit, the packet data processed by the ingress pipeline; and obtaining, by an egress pipeline of the integrated circuit, from the shared queuing system, the packet data processed by the ingress pipeline; and further processing, by the egress pipeline, the packet data processed by the ingress pipeline;

wherein:

the ingress pipeline comprises a configurable parser and configurable match-action stages;

the egress pipeline comprises at least one other stage;

the configurable parser is to be configured, in accordance with the configuration data, to parse packet header fields to generate multiple sets of header field data;

the multiple sets of header field data comprise (1) at least one set of header field data for use by at least one of the match-action stages and (2) at least one other set of header field data;

the at least one of the match-action stages is to perform actions associated with at least certain portions of the at least one set of header field data;

the at least one of the match-action stages is to determine the actions based upon matching, at least in part, of the at least one set of header field data with match table data;

the match action table data is configurable to comprise both (1) ternary content addressable table data to be stored in the TCAM and (2) exact match table data;

the actions and the match action table data are to be configured based upon the configuration data;

the actions are configurable to comprise packet header data modification and/or packet data port assignment;

the at least one other stage is to generate output packet data for output from the integrated circuit;

the at least one other stage is to generate the output packet data based upon modified packet header data generated by the at least one of the match-action stages;

the at least one other set of header field data is unavailable for match-action stage modification; and the parser is configurable, based upon the configuration data, to store the at least one set of header field data, at least in part, in containers of different sizes.

12. The method of claim 11, wherein:
the parser is to extract the at least one set of header field data and the at least one other set of header field data in accordance with parse graph data that defines manner of header field extraction in terms of current bit field and next bit field for extraction; and the parse graph data is to be defined by the configuration data.

13. The method of claim 12, wherein:
the configuration data is to be generated by a compiler based upon user-written code; and the compiler is not part of the integrated circuit.

14. The method of claim 13, wherein:
the actions are also configurable to comprise:
  address modification; and
  packet data drop; and
the packet switching-related operations are configurable to comprise:
  multi-layer tunneling protocol processing;
  GENEVE/GRE protocol processing; and
  variable field processing.

15. The method of claim 14, wherein:
the configuration data is configurable to instruct the parser to determine when header end has been reached, and to stop parse graph traversal and header parsing.

16. A hardware switch configurable to be used in association with ternary content addressable memory (TCAM), the hardware switch being for use in a network, the hardware switch comprising:
  ingress ports;

egress ports; and an integrated circuit coupled to both the ingress ports and the egress ports, the integrated circuit being for use in packet switching-related operations in the network, the packet switching-related operations being programmable based upon configuration data to be received by the integrated circuit, the integrated circuit comprising:

an ingress pipeline to process packet data received by the integrated circuit via the ingress ports;

a shared queuing system to queue the packet data processed by the ingress pipeline; and an egress pipeline to obtain, from the shared queuing system, the packet data processed by the ingress pipeline, and also to further process the packet data processed by the ingress pipeline;

wherein:

the ingress pipeline comprises a configurable parser and configurable match-action stages;

the egress pipeline comprises at least one other stage;

the configurable parser is to be configured, in accordance with the configuration data, to parse packet header fields to generate multiple sets of header field data;

the multiple sets of header field data comprise (1) at least one set of header field data for use by at least one of the match-action stages and (2) at least one other set of header field data;

the at least one of the match-action stages is to perform actions associated with at least certain portions of the at least one set of header field data;

the at least one of the match-action stages is to determine the actions based upon matching, at least in part, of the at least one set of header field data with match table data;

the match action table data is configurable to comprise both (1) ternary content addressable table data to be stored in the TCAM and (2) exact match table data;

the actions and the match action table data are to be configured based upon the configuration data;

the actions are configurable to comprise packet header data modification and/or packet data port assignment;

the at least one other stage is to generate output packet data for output from the integrated circuit;

the at least one other stage is to generate the output packet data based upon modified packet header data generated by the at least one of the match-action stages;

the output packet data is for output via at least one of the egress ports;

the at least one other set of header field data is unavailable for match-action stage modification; and the parser is configurable, based upon the configuration data, to store the at least one set of header field data, at least in part, in containers of different sizes.

17. The hardware switch of claim 16, wherein:

the parser is to extract the at least one set of header field data and the at least one other set of header field data in accordance with parse graph data that defines manner of header field extraction in terms of current bit field and next bit field for extraction; and the parse graph data is to be defined by the configuration data.

18. The hardware switch of claim 17, wherein:

the configuration data is to be generated by a compiler based upon user-written code; and the compiler is not part of the integrated circuit.

19. The hardware switch of claim 18, wherein:

the actions are also configurable to comprise:

address modification; and packet data drop; and the packet switching-related operations are configurable to comprise:

multi-layer tunneling protocol processing;

GENEVE/GRE protocol processing; and variable field processing.

20. The hardware switch of claim 19, wherein:

the configuration data is configurable to instruct the parser to determine when header end has been reached, and to stop parse graph traversal and header parsing.

* * * * *